(12) United States Patent
Iwasaki et al.

(10) Patent No.: US 8,364,645 B2
(45) Date of Patent: *Jan. 29, 2013

(54) DATA MANAGEMENT SYSTEM AND DATA MANAGEMENT METHOD

(75) Inventors: Masaaki Iwasaki, Tachikawa (JP); Kiyotake Kumazawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 52 days.

This patent is subject to a terminal disclaimer.

(21) Appl. No.: 12/775,549

(22) Filed: May 7, 2010

(65) Prior Publication Data

US 2010/0241656 A1     Sep. 23, 2010

Related U.S. Application Data

(63) Continuation of application No. 11/604,684, filed on Nov. 28, 2006, now Pat. No. 7,730,071.

(30) Foreign Application Priority Data

Sep. 13, 2006   (JP) .................................. 2006-247896

(51) Int. Cl.
*G06F 7/00* (2006.01)
(52) U.S. Cl. ........ 707/652; 707/666; 707/823; 707/825; 707/827; 707/828
(58) Field of Classification Search ........................ None
See application file for complete search history.

(56) References Cited

U.S. PATENT DOCUMENTS

| | | | | |
|---|---|---|---|---|
| 5,495,607 A | * | 2/1996 | Pisello et al. | 707/797 |
| 5,566,331 A | * | 10/1996 | Irwin et al. | 1/1 |
| 6,353,878 B1 | * | 3/2002 | Dunham | 711/162 |
| 6,915,316 B1 | * | 7/2005 | Patterson et al. | 1/1 |
| 7,136,862 B2 | * | 11/2006 | Mogi et al. | 1/1 |
| 8,127,095 B1 | * | 2/2012 | Colgrove et al. | 711/162 |
| 2003/0046313 A1 | * | 3/2003 | Leung et al. | 707/204 |
| 2003/0221063 A1 | | 11/2003 | Eguchi et al. | |
| 2004/0163029 A1 | * | 8/2004 | Foley et al. | 714/769 |
| 2004/0205152 A1 | * | 10/2004 | Yasuda et al. | 709/217 |
| 2004/0267830 A1 | | 12/2004 | Wong et al. | |

(Continued)

FOREIGN PATENT DOCUMENTS

| | | |
|---|---|---|
| JP | 05313971 A | 11/1993 |
| JP | 2003-280950 A | 10/2003 |

(Continued)

OTHER PUBLICATIONS

Japanese Office Action corresponding to Japanese Patent Application No. 2006-247896, dated Nov. 15, 2011.

(Continued)

*Primary Examiner* — Debbie Le
*Assistant Examiner* — Anh Tai Tran
(74) *Attorney, Agent, or Firm* — Sughrue Mion, PLLC

(57) ABSTRACT

A file system transfer designation section for transferring the file system matching with file system transfer rules from the first volume of the first storage apparatus to the second volume of the second storage apparatus based on the first file system transfer rules, a file system storage information manager for updating storage information of the file system in accordance with transfer of the file system by the file system transfer designation section, and transmitting the updated file system storage information, and a search information manager for updating search information for searching the files based on a file search request from the client apparatus using the file system storage information sent by the file system storage information manager are provided.

18 Claims, 15 Drawing Sheets

U.S. PATENT DOCUMENTS

| | | |
|---|---|---|
| 2005/0138315 A1 | 6/2005 | Eguchi et al. |
| 2005/0216591 A1 | 9/2005 | Sato |
| 2006/0010154 A1* | 1/2006 | Prahlad et al. ............... 707/102 |
| 2006/0010169 A1* | 1/2006 | Kitamura ...................... 707/200 |
| 2006/0095697 A1 | 5/2006 | Eguchi et al. |
| 2007/0113037 A1 | 5/2007 | Eguchi et al. |

FOREIGN PATENT DOCUMENTS

| | | |
|---|---|---|
| JP | 2003345522 A | 12/2003 |
| JP | 2005165485 A | 6/2005 |
| JP | 2005276017 A | 10/2005 |
| WO | 95/23376 A1 | 8/1995 |

OTHER PUBLICATIONS

Mecozzi D. et al., Design for a Transparent, Distributed File System, Proceedings of the Symposium on Mass Storage Systems. Monterey, Oct. 7, 1991, Los Alamitos, IEEE Comp. Soc. Press, US, vol. SYMP. 11. p. 78.

* cited by examiner

FIG.7

| FILE SYSTEM IDENTIFIER | FILE SYSTEM STATE | ORIGINAL HOST APPARATUS IDENTIFIER | ORIGINAL STORAGE APPARATUS IDENTIFIER | ORIGINAL LOGICAL VOLUME IDENTIFIER | CURRENT HOST APPARATUS IDENTIFIER | CURRENT STORAGE APPARATUS IDENTIFIER | CURRENT LOGICAL VOLUME IDENTIFIER |
|---|---|---|---|---|---|---|---|
| 141, 151 | 142, 152 | 143, 153 | 144, 154 | 145, 155 | 146, 156 | 147, 157 | 148, 158 |
| MAPPING RECORD | | | | | | | |
| MAPPING RECORD | | | | | | | |
| MAPPING RECORD | | | | | | | |
| MAPPING RECORD | | | | | | | |
| ... | ... | ... | ... | ... | ... | ... | ... |

149, 159

23

DATA MANAGEMENT SYSTEM AND DATA MANAGEMENT METHOD

This is a continuation of application Ser. No. 11/604,684 filed Nov. 28, 2006. The entire disclosure(s) of the prior application(s), application Ser. No. 11/604,684 is considered part of the disclosure of the accompanying continuation application and is hereby incorporated by reference.

CROSS-REFERENCES TO RELATED APPLICATIONS

This application relates to and claims priority from Japanese Patent Application No. 2006-247896, filed on Sep. 13, 2006, the entire disclosure of which is incorporated herein by reference.

BACKGROUND

The present invention relates to a data management system and data management method appropriate for application in data management systems for searching files based on requests from, for example, client apparatus.

In the related art, computer systems are implemented where a client apparatus, host apparatus and storage apparatus are connected to a network so that files managed by the client apparatus are transmitted and received via the host apparatus and the network, and the files are stored on a hard disc within the storage apparatus.

In this kind of computer system, for example, file systems (sets of files) that are not used often are transferred from so-called high-cost hard disc drives within the storage apparatus to so-called low cost disc drives.

Further, with this kind of computer system, for example, file search apparatus are connected to a network. When there is then a file read request instructing the reading of a predetermined file from the client apparatus, the client apparatus searches for the requested file, and the file is read out from the storage apparatus to the client apparatus.

However, a search engine for the file search apparatus is usually developed and put into the form of a product by a dedicated vendor, while software for transferring files of the storage apparatus is developed and put into the form of a product by a storage apparatus vendor. The means that the interface connecting the file search apparatus and the storage apparatus is not standardized.

Because of this, at the search engine for the file search apparatus, after making a search index table constituting an index in the searching of a file, at the storage apparatus, in the event of transferring the file system, it is no longer possible to search files of the file system based on the search index table and an error therefore results. Therefore, with this kind of computer system, it is necessary to re-make the search index table in order to search files based on the search index table.

In theory, the administrator of the storage apparatus refers to the transfer history, and takes into consideration an operation where the search index table is updated every transferred file system, but there are cases where several hundred thousand files are stored in one file system of the storage apparatus. As the search index table is made in file units, it is not practical for the administrator of the storage apparatus to update the search index table.

As a result, a file management system is proposed in Japanese Patent Laid-open Publication No. 2003-280950 where not used information for file storage locations, metadata for the files and access priority information is managed, the stored files are accessed and rewriting of the files is carried out, where data access are exclusively controlled and the storage locations of files are changed based on storage location information and access priority information for files contained in the metadata.

However, in recent years from the point of view of compliance (act adherence) etc., it is necessary even for files that are used infrequently to be held for fixed periods. File systems for files that are used infrequently are therefore transferred to other storage apparatus and saved.

In the event that this kind of file system is transferred to another storage apparatus, or in the event that a file system is transferred to another storage apparatus the host apparatus is incapable of mounting, it is not possible to update the storage location information for the file system, files of the file system cannot be searched, and as a result it is not possible to read files requested by the client apparatus.

SUMMARY

In order to take the aforementioned points into consideration, the present invention therefore proposes a data management system and data management method with highly reliable data management.

In order to resolve these problems, in one aspect of the present invention, a data management system with a host apparatus receiving requests from client apparatus, first storage apparatus having a first volume for storing a file system composed of a set of files, and a second storage apparatus having a second volume for storing the file system sent from the first storage apparatus comprises a file system transfer designation section for transferring the file system matching with file system migration rules from the first volume of the first storage apparatus to the second volume of the second storage apparatus based on the first file system migration rules, a file system storage information manager for updating storage information of the file system in accordance with transfer of the file system by the file system transfer designation section, and transmitting the updated file system storage information, and a search information manager for updating search information for searching the files based on a file search request from the client apparatus using the file system storage information sent by the file system storage information manager.

Further, in an aspect of the present invention, a data management system with a host apparatus receiving requests from client apparatus, first storage apparatus having a first volume for storing a file system composed of a set of files, and a second storage apparatus having a second volume for storing the file system sent from the first storage apparatus comprises a first step of transferring the file system matching with file system migration rules from the first volume of the first storage apparatus to the second volume of the second storage apparatus based on the first file system migration rules, a second step of updating storage information for the file system in accordance with transfer of the file system of the first step, and transmitting the stored information of the updated file system, and a third step of updating the search information for searching the files based on file search requests from the client apparatus using file system storage information sent in the second step.

Therefore, when a file search request is received from the client apparatus, a state where search information is not updated is effectively prevented before it happens, it is possible to search for a file corresponding to the file search request, and as a result, it is possible to read the file requested by the client apparatus.

According to the present invention, it is possible to implement a data management system and data management method where the reliability of file management is high.

Other aspects and advantages of the invention will be apparent from the following description and the appended claims.

BRIEF DESCRIPTION OF THE DRAWINGS

FIG. 7 is a conceptual view illustrating a file system transfer management table;

DETAILED DESCRIPTION OF PREFERRED EMBODIMENTS

The following is a description with reference to the drawings below of a first embodiment of the present invention.

Figure 1:
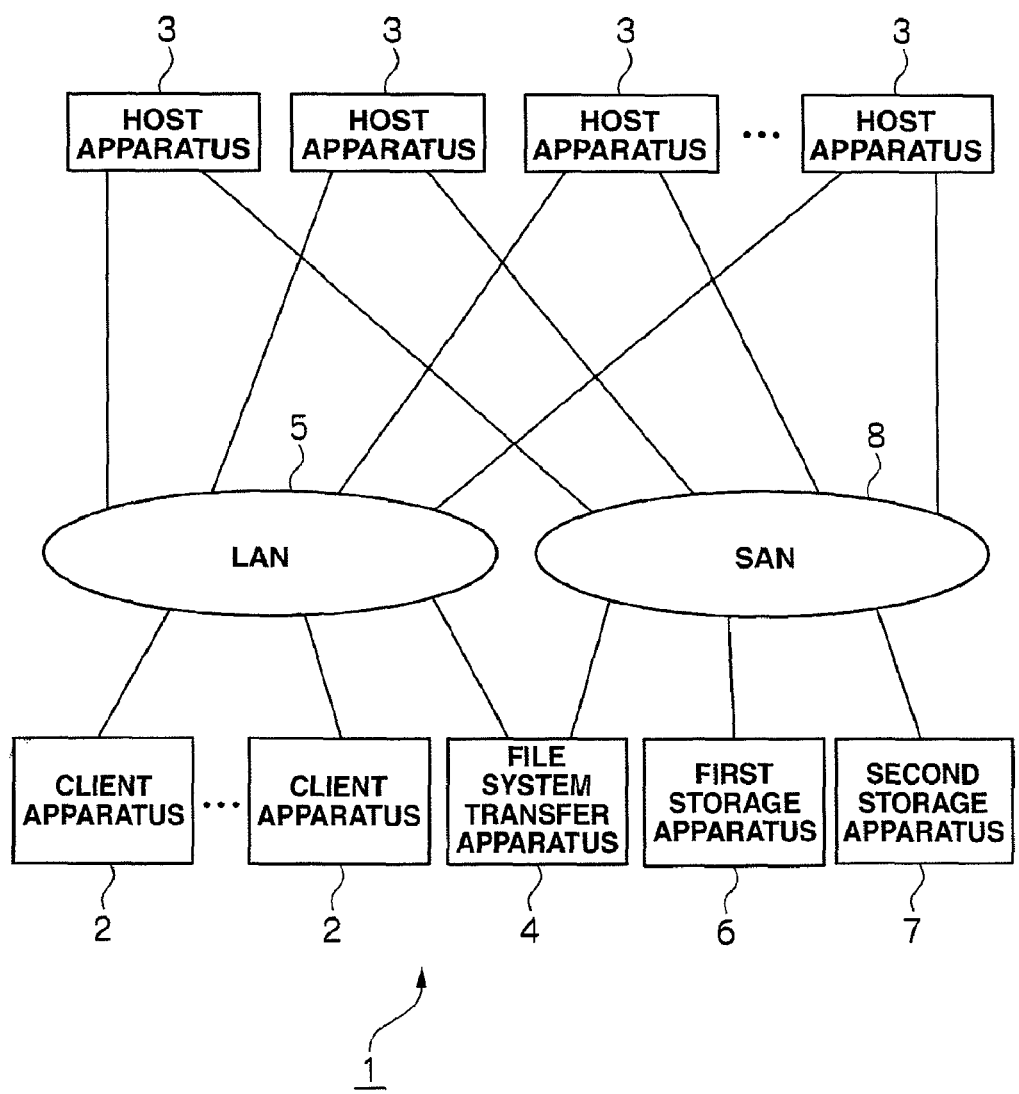
FIG. 1 is a block view showing an outline configuration for a data management system of an embodiment.

FIG. 1 shows a configuration for a data management system 1 of an embodiment of the present invention. The data management system 1 is comprised of client apparatus 2, host apparatus 3 and file system transfer apparatus 4 connected via a LAN (Local Area Network) 5, and the host apparatus 3, file system transfer apparatus 4, first storage apparatus 6 and second storage apparatus 7 connected via an SAN (Storage Area Network) 8.

The client apparatus 2 is computer apparatus equipped with information processing resources such as a CPU (Central Processing Unit) and memory etc., such as, for example, a personal computer etc. The client apparatus 2 are connected to information input apparatus (not shown) such as a keyboard, switches and pointing apparatus, and microphone etc., and also have information output apparatus (not shown) such as monitor displays and speakers etc. In this event, the client apparatus 2 sends a file read-out request to read out a file to the host apparatus 3 based on a file search request for searching files resulting from designation using, for example, keywords etc. and the search results.

Figure 2:
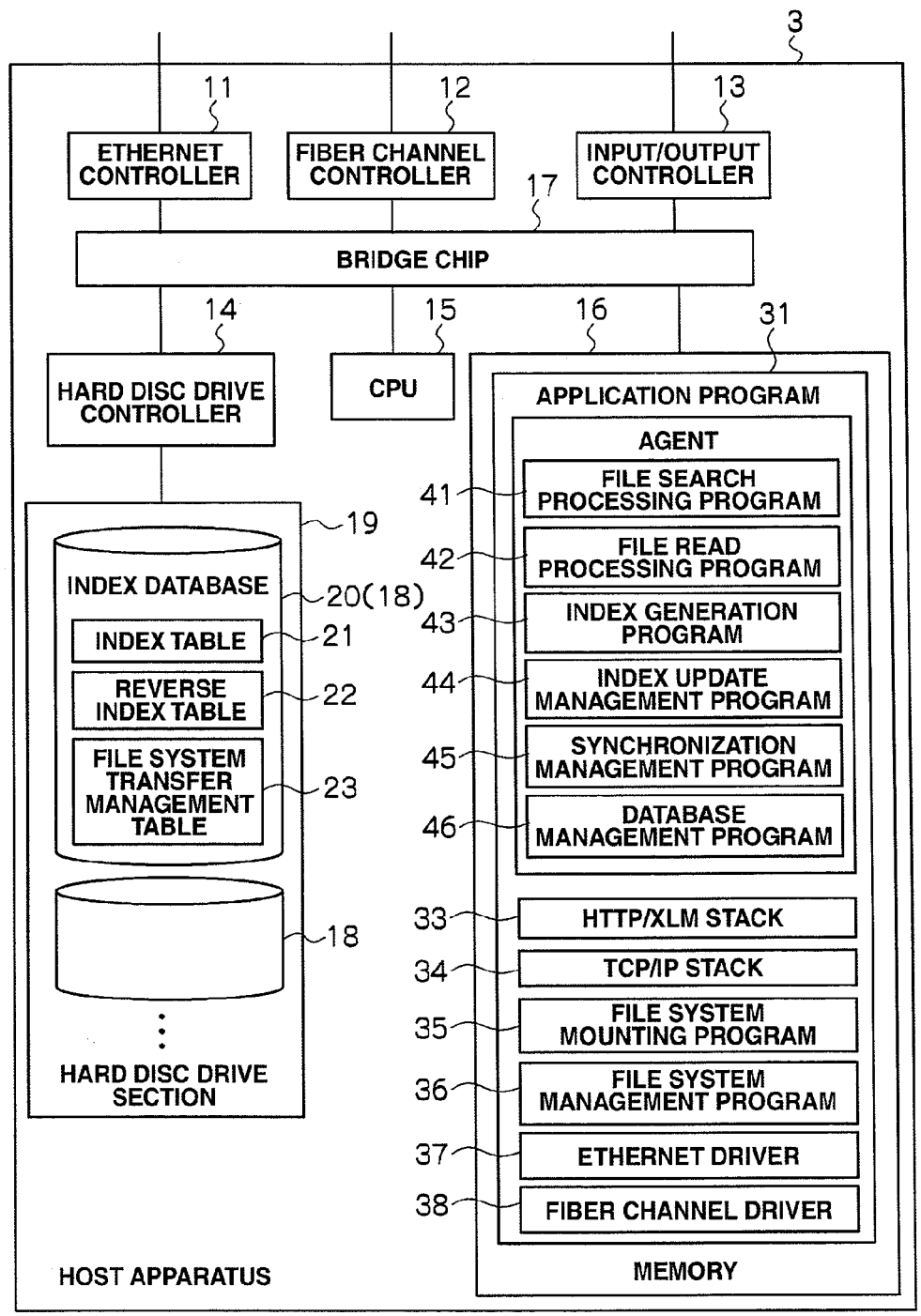
FIG. 2 is a block view showing an outline configuration for host apparatus.

FIG. 2 shows a configuration for the host apparatus 3. The host apparatus 3 is configured from an Ethernet (registered trademark) controller 11 connected to LAN 5 for controlling Ethernet (registered trademark) communication, a fiber channel controller 12 for controlling fiber channel communication, an input/output controller 13 for controlling information input apparatus and information output apparatus, a hard disc drive controller 14 for controlling a hard disc drive section 19, a CPU 15 for performing overall control of the host apparatus 3, and a memory 16 for storing various programs etc, with each element of this configuration described above being connected via a bridge chip 17 for controlling transfer of files etc.

Further, the hard disc drive section 19 equipped with a number of hard disc drives 18 is connected to the hard disc drive controller 14. In this event, some or all of predetermined hard disc drives 18 are used as an index database 20 for storing various tables etc. used in file searching etc. An index table 21 for storing location information etc. every file, a reverse index table 22 for storing file information etc. containing the keywords every keyword, and a file system transfer management table 23 for storing information etc. for before and after transfer for file systems for between logical volumes of storage apparatus described later are stored in the index database 20. A detailed description of the index table 21, reverse index table 22 and file system transfer management table 23 is given in the following.

Here, a file system is a set of files. In this event, a large number of files are contained in one file system. A file is digital data and a file system that is this set is also digital data. A logical volume is equipment for storing the file system. In this embodiment, a one to one configuration is adopted where one file system is stored in one logical volume, but the present invention is by no means limited in this respect, and may also be applied to a configuration where a single file system spans a number of logical volumes, or where a single logical volume stores a number of file systems.

Further, an application program 31 that is a program for executing various processing is also stored in the memory 16 of the host apparatus 3. The application program 31 is comprised of an agent 21 that is a program executing file search processing and file reading processing, an HTTP/XML stack 33 for executing control based on HTTP/XML (HyperText Transfer Protocol/eXtensible Markup Language), a TCP/IP stack 34 for executing control based on TCP/IP (Transmission Control Protocol/Internet Protocol), a file system mounting program 35 that is a program for managing file systems mounted/un-mounted at the host apparatus 3, a file system management program 36 that is a program for managing file systems, an Ethernet (registered trademark) driver 37 that is a driver for controlling the Ethernet (registered trademark) controller 11, and a fiber channel driver 38 that is a driver for controlling the fiber channel controller 12. Here, "mount" refers to recognizing the file system at the host 3 and puts the host apparatus 3 into a state enabling the execution of read/write processing.

The agent 32 is comprised of a file search processing program 41, a file reading processing program 42, an indexing program 43, an index update management program 44, a synchronization management program 45, and a database management program 46. A detailed description of each type of program is given in the using the flowchart in the following.

The hardware configuration of this host apparatus 3 may be implemented through various forms of general purpose computers (personal computers), workstations, and mainframes, etc. The index table 21, reverse index table 22 and file system transfer management table 23 may be stored in the memory 16.

Figure 3:
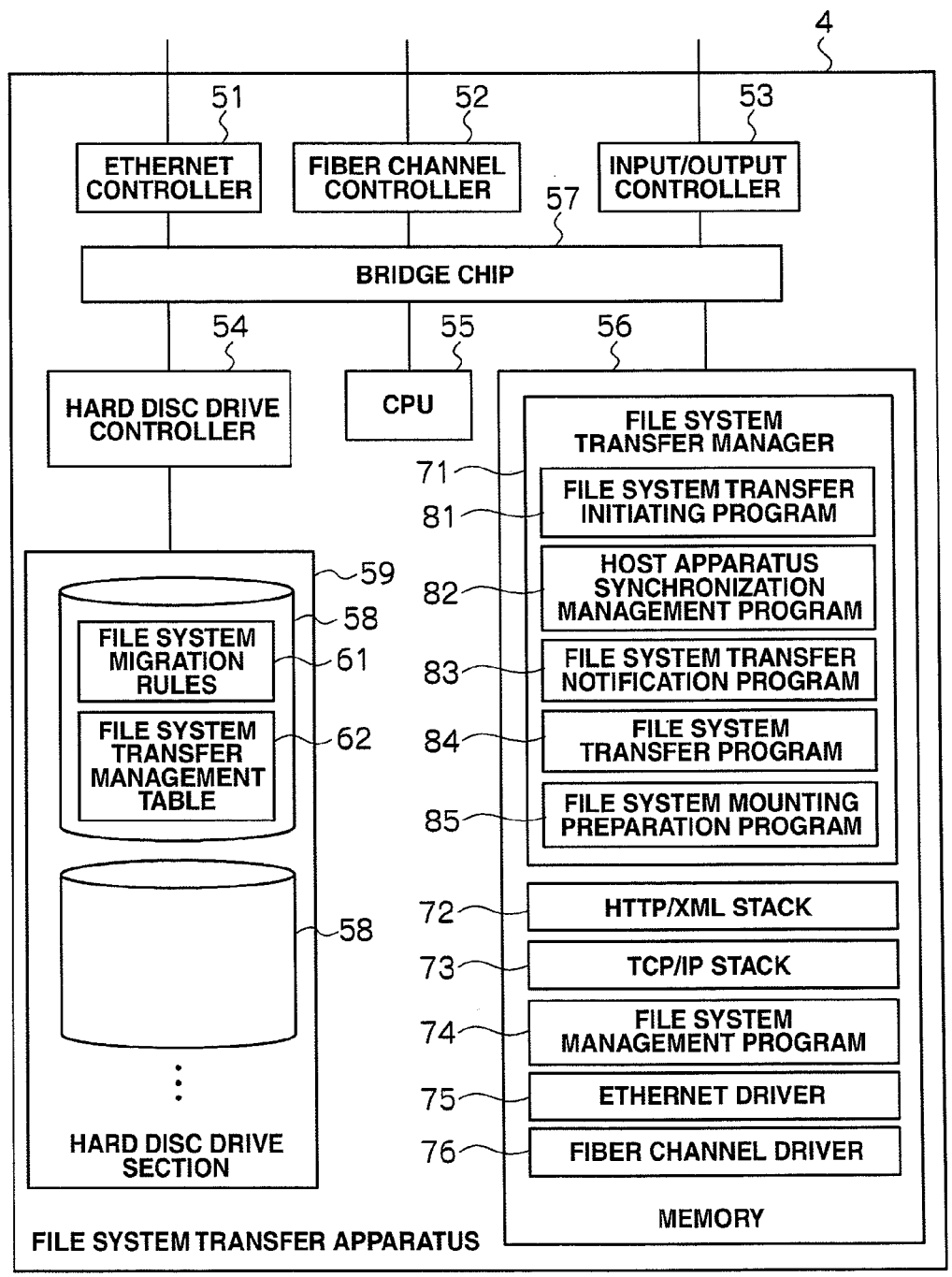
FIG. 3 is a block view showing an outline configuration for file system transfer apparatus.

FIG. 3 shows a configuration for the file system transfer apparatus 4. The file system transfer apparatus 4 adopts the same configuration as for the host apparatus 3, with the exception that the various programs and information etc. stored in the memory 56 and the hard disc drive section 59 are different. Namely, the file system transfer apparatus 4 is implemented using a general purpose computer (personal computer), etc. The file system transfer apparatus 4 is comprised of an Ethernet (registered trademark) controller 51, a fiber channel controller 52, an input/output controller 53, a hard disc drive controller 54, a CPU 55, and a memory 56 connected via a bridge 57.

A hard disc drive section 59 equipped with a plurality of hard disc drives 58 is connected to the hard disc controller 54. In this event, migration rules 61 and a file system transfer management table 62 are stored in a predetermined hard disc drive 58.

Fixed rules for transferring a file system, such as, for example, "in the event that any files of the file system have not been subjected to reading or writing processing for a predetermined period, transfer this file system from the first storage apparatus 6 to the second storage apparatus 7", and "in the event that the final update time where the frequency of read/write processing during the preceding three months is low at 20% of the file systems mounted at the host apparatus 3 is checked and one month or more has passed since the final update time, this file system is transferred from the first storage apparatus 6 to the second storage apparatus 7", are described in the migration rules 61. The configuration of the file system transfer management table 62 is the same as the file system transfer management table 23 described above.

Further, a file system transfer manager 71 that is a program for executing file system transfer processing etc., a HTTP/XML stack 72, a TCP/IP stack 73, a file system management program 74, an Ethernet (registered trademark) driver 75 and a fiber channel driver 76 are stored in the memory 16 of the file system transfer apparatus 4. The file system management program 74 differs from the file system mounting program 35 in managing the file systems that are mounted/un-mounted at all of the host apparatus 3.

The file system transfer manager 71 is comprised of a file system transfer initiating program 81, a synchronization management program 82, a file system transfer notification program 83, a file system transfer program 84, and a file system mounting preparation program 85. A detailed description of each type of program is given in the using the flowchart in the following.

The hardware configuration of this file system transfer apparatus 4 may be implemented by personal computers etc. in various forms. The migration rules 61 and the file system transfer management table 62 may also be stored in the memory 56.

Figure 4:
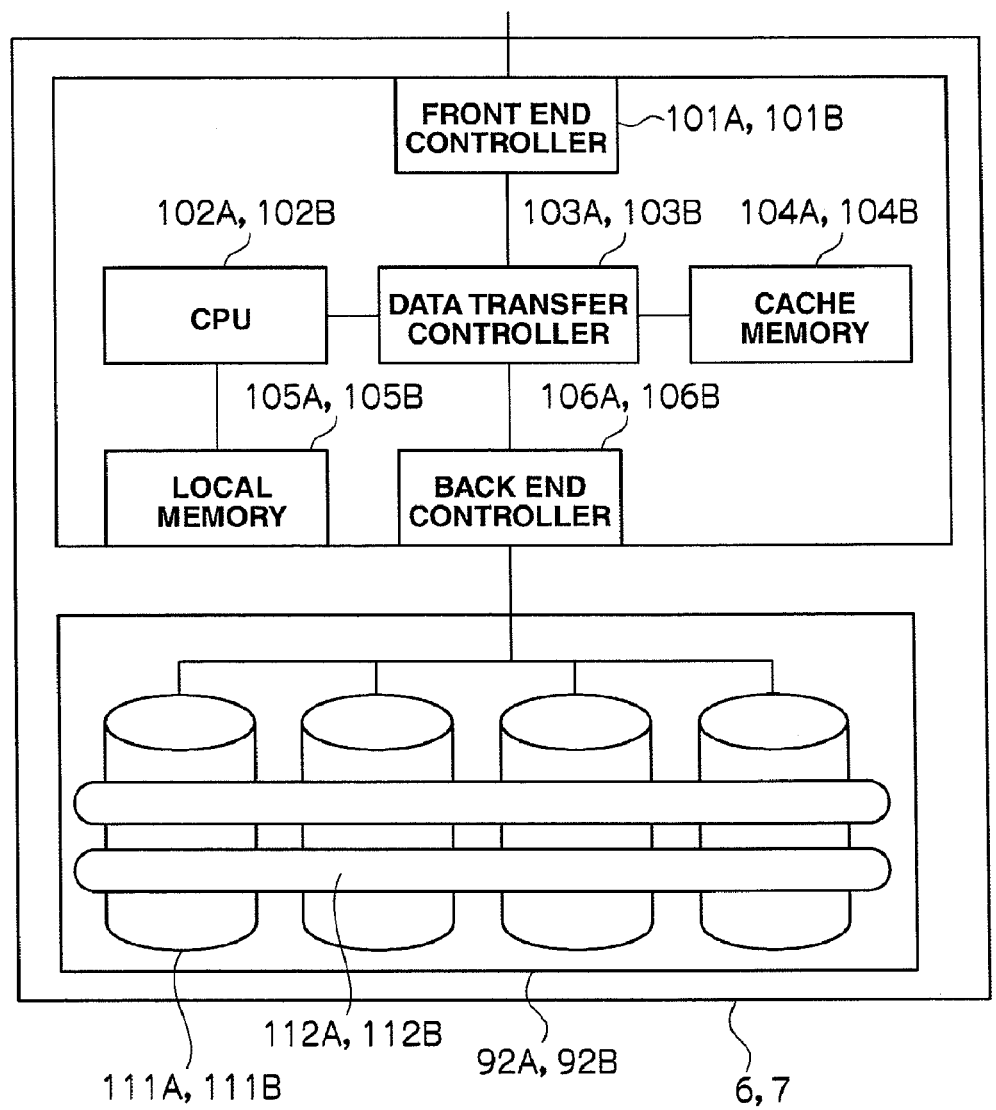
FIG. 4 is a block view showing an outline configuration for the first storage apparatus and the second storage apparatus.

FIG. 4 shows a configuration for the first storage apparatus 6 and the second storage apparatus 7. The first storage apparatus 6 is comprised of storage controller 91A and a storage section 92A. The storage controller 91A is configured in such a manner that a front end controller 101A for controlling fiber channel communication connected to SAN8, CPU 102A for overall control of the first storage apparatus 6, a back end controller 106A connected to the cache memory 104A for temporarily storing transmitted and received files and storage section 92A, for controlling communication with the storage section 92A, are connected with each element of the configuration described above, and are connected via data transfer controller 103A for controlling the transfer of data. Further, a local memory 105A for storing programs and tables necessary for controlling the first storage apparatus 6 and information etc. is connected to the CPU 102A. Moreover, the storage section 92A is equipped with a plurality of hard disc drives 111A.

The CPU 102A is capable of controlling the plurality of hard disc drives 111A using RAID levels (for example, RAID0, 1, 5 etc.) defined in the so-called RAID system. The RAID system manages a plurality of hard disc drives 111A as a single RAID group. A plurality of logical volumes 112A are then defined in access units by the host apparatus 3 on the RAID group. A LUN (Logical Unit Number) is allocated to the respective logical volumes 112A.

The hard disc drive 111A is, for example, a storage device such as an FC (Fibre Channel) disc drive, a SATA (Serial Advanced Technology Attachment) disc drive, a PATA (Parallel Advanced Technology Attachment) disc drive, a FATA (Fibre Attached Technology Adapted) disc drive, an SAS (Serial Attached SCSI) disc drive, or a SCSI (Small Computer System Interface) disc drive, etc.

The second storage apparatus 7 has the same configuration as the first storage apparatus 6 described above, with each element of the configuration of the second storage apparatus 7 being given the same numerals for the same portions as the configuration elements of the first storage apparatus 6, with suffix "A" being substituted with suffix "B". At the data management system 1, from the point of view that the second storage system 7 is a storage system for archiving use, the disc drive 111A of the first storage system 6 is configured from, for example, a so-called high-cost hard disc drive such as a SCSI (Small Computer System Interface) disc drive etc., and the drive 111B of the second storage system 7 is configured from a so-called low-cost hard disc drive such as, for example, a SATA (Serial AT Attachment) disc drive or optical disc drive, etc.

Next, a description is given of the configuration of the index table 21, reverse index table 22, and file system transfer management table 23.

Figure 5:
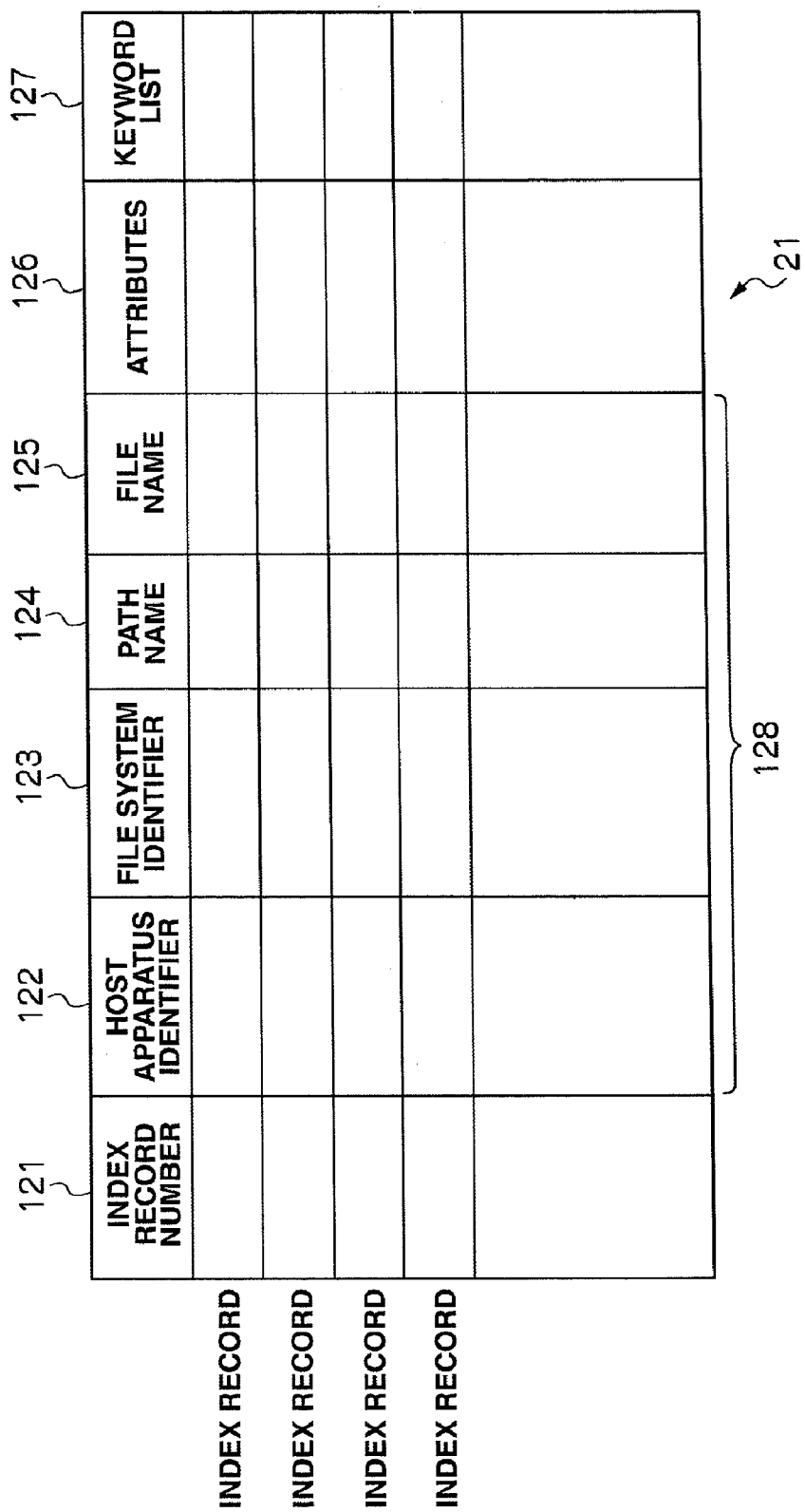
FIG. 5 is conceptual view illustrating an index table.

FIG. 5 is a view showing a configuration for the index table 21. The index table 21 stores an index record number 121 for identifying the index record, a host apparatus identifier 122 for identifying the host apparatus 3 that made the file, a file system identifier 123 for identifying the file system for the logical volume storing the file, a path name 124 for a path indicating the location of the file system, a file name 125 for the file, attributes 126 comprised of a file update date and access priority control information etc., and a keyword list 127 composed of keywords for the file, every index record. There are also cases where the host apparatus identifier 122, file system identifier 123, path name 124 and file name 125 are collectively referred to as location information 128. The host apparatus identifier 122 is to take into consideration the case where a plurality of host apparatus exist, where a host apparatus 3 mounted to after a logical volume goes temporarily offline (described later) and goes online once again (described later) is different to the host apparatus 3 that first made the file.

Figure 6:
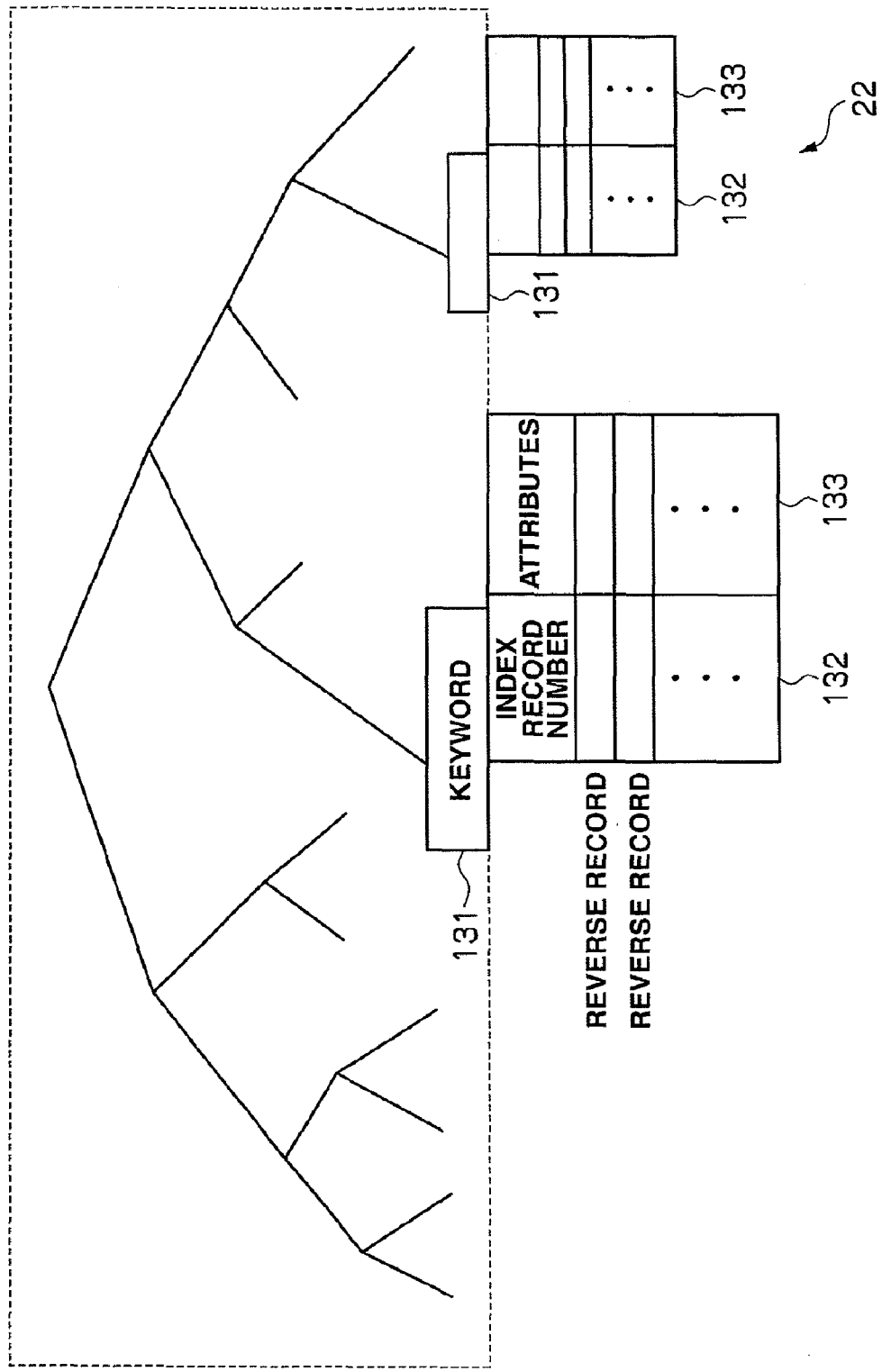
FIG. 6 is a conceptual view illustrating a reverse index table.

FIG. 6 is a view showing a configuration for the reverse index table 22. The reverse index table 22 is a table adopting, for example, a B-Tree (Balanced tree) algorithm, that is capable of searching using an index tree (index tree) of this structure at high-speed. This reverse index table 22 is capable of searching every keyword 131. The reverse index table 22 stores an index record number 132 and attributes 133 for a file having this keyword 131 every reverse record for the keyword 131. In this event, the index record number 132 of the reverse index table 22 corresponds to the index record number 121 of the index table 21. The reverse index table 22 is then capable of searching the index record number 121 of the index table 21 from the keyword 131.

FIG. 7 shows a configuration for the file system transfer management table 23. The file system transfer management table 23 stores a file system identifier 141, a file system state 142 indicating the storage state of the file system, an original host apparatus identifier 143 for identifying the host apparatus 3 that made the file first, an original storage apparatus identifier 144 for identifying the storage apparatus that stored the file system before transfer, an original logical volume identifier 145 for identifying the logical volume that stored the file system before transfer, a current host apparatus identifier 146 for identifying a host apparatus 3 mounting a file system currently containing the file, a current storage apparatus identifier 147 for identifying the storage apparatus currently storing the file system, and an original logical volume identifier 148 for identifying the logical volume currently storing the file system, every mapping record.

It is necessary to update the file system state 142, the original host apparatus identifier 143, the original storage apparatus identifier 144, the original logical volume identifier 145, the current host apparatus identifier 146, the current storage apparatus identifier 147, and the original logical volume identifier 148 as a result of transfer of the file system. Further, there are cases where the file system state 142, the original host apparatus identifier 143, the original storage apparatus identifier 144, the original logical volume identifier 145, the current host apparatus identifier 146, the current storage apparatus identifier 147, and the original logical volume identifier 148 are collectively referred to as file system transfer information 149.

At the file system state 142, for example, "primary storage" is described for the case where the file system is stored in the first storage apparatus 6, "secondary storage" is described for the case where the file system is stored in the second storage apparatus 6, "write enable" is described in the case where the file system can be written to, "write inhibit" is described for the case where it is not possible to write to the file system, "online" is described for the case where the file system is mounted at the host apparatus 3, and "offline" is described for the case where the file system is not mounted at the host apparatus 3. A sequential description is given of a state transition for the storage state of the file system. Further, "online" indicates the state where the file system is mounted at the host apparatus 3, and offline indicates the state where the file system is not mounted at the host apparatus 3.

Further, the file system transfer management table 62 stores a file system identifier 151, a file system state 152, an original host identifier 153, an original storage apparatus identifier 154, an original logical volume identifier 155, a current host apparatus identifier 156, a current storage apparatus identifier 157, and an original logical volume identifier 158, every mapping record. Moreover, there are cases where the file system state 152, the original host identifier 153, the original storage apparatus identifier 154, the original logical volume identifier 155, the current host apparatus identifier 156, the current storage apparatus identifier 157, and the original logical volume identifier 158 are collectively referred to as file system transfer information 159.

Figure 8:
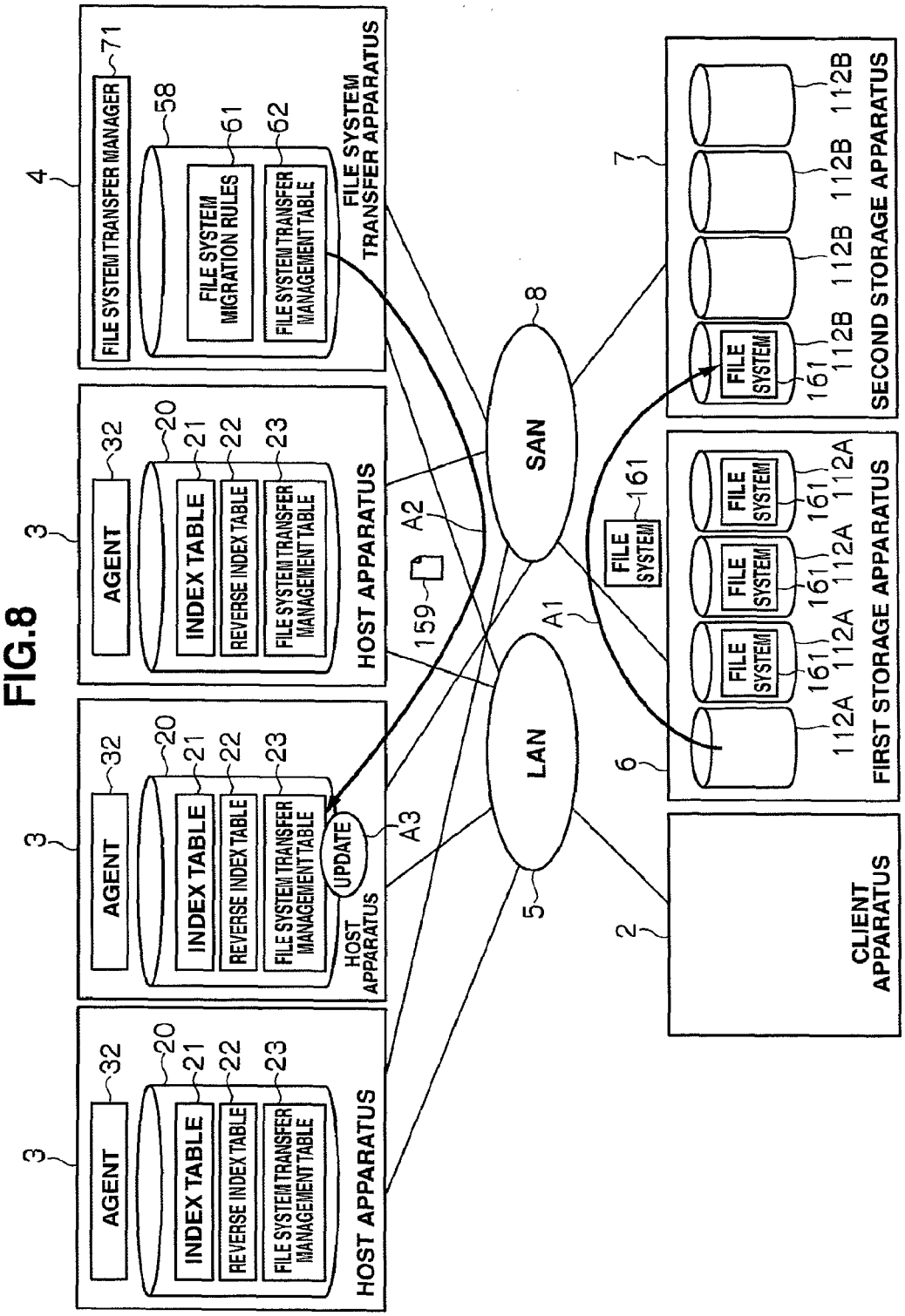
FIG. 8 is a conceptual view illustrating an outline of an operation for a data management system.

FIG. 8 shows an outline of the operation of the data management system 1. With the data management system 1, at the file system transfer apparatus 4, the file system is transferred from the logical volume 112A of the first storage apparatus 6 to the logical volume 112B of the second storage apparatus 7 based on the file system transfer management table 61 (A1), the file system transfer update information 159 of the file system transfer management table 62 of the file system transfer management apparatus 4 updated in accordance with the transfer of the file system is sent to the host apparatus 3 (A2), and the file system transfer information 159 of the file system transfer management table 23 of the index database 20 of the host apparatus 3 is updated (A3).

Specifically, describing an outline of an operation of the data management system 1, the host apparatus 3 stores the file in the logical volume 112A of the first storage apparatus 6 by sending the file sent from the client apparatus 2 to the first storage apparatus 6. The host apparatus 3 reads out and analyzes a file sent from the client apparatus 2, or made or updated at the host apparatus 3 from the first storage apparatus 6 by periodically executing the agent 32, and makes location information 128, attributes 126, or a keyword list 127. The host apparatus 3 updates the index table 21 and the reverse index table 22 of the index database 20 using the produced location information 128, attributes 126, and keyword list 127.

Here, the file system transfer apparatus 4 transfers the file system 161 from the logical volume 112A of the first storage apparatus 6 to the logical volume 112B of the second storage apparatus 7 by executing the file system transfer manager 71 at a predetermined timing, and sending a file system transfer request for the file system 161 to the first storage apparatus 6 and the second storage apparatus 7 at a predetermined period where reading and writing processing is not taking place in accordance with the migration rules 61.

When transfer of the file system 161 is complete, the file system transfer apparatus 4 updates the file system transfer information 159 of the file system transfer management table 62. The file system transfer apparatus 4 then sends the file system transfer information 159 of the updated file system transfer management table 62 to the host apparatus 3 together with the file system transfer notification.

The host apparatus 3 then updates the file system transfer information 149 of the file system transfer management table 23 of the index database 20 using the file system transfer update information 159 of the transmitted file system transfer management table 62.

As a result, at the data management system 1, when a file search request is received from the client apparatus 2, the state where the file system management table 23 is not updated is effectively prevented before it happens, it is possible to search for the file corresponding to the file search request, and as a result, it is possible to read the file requested by the client apparatus 2.

Figure 9:
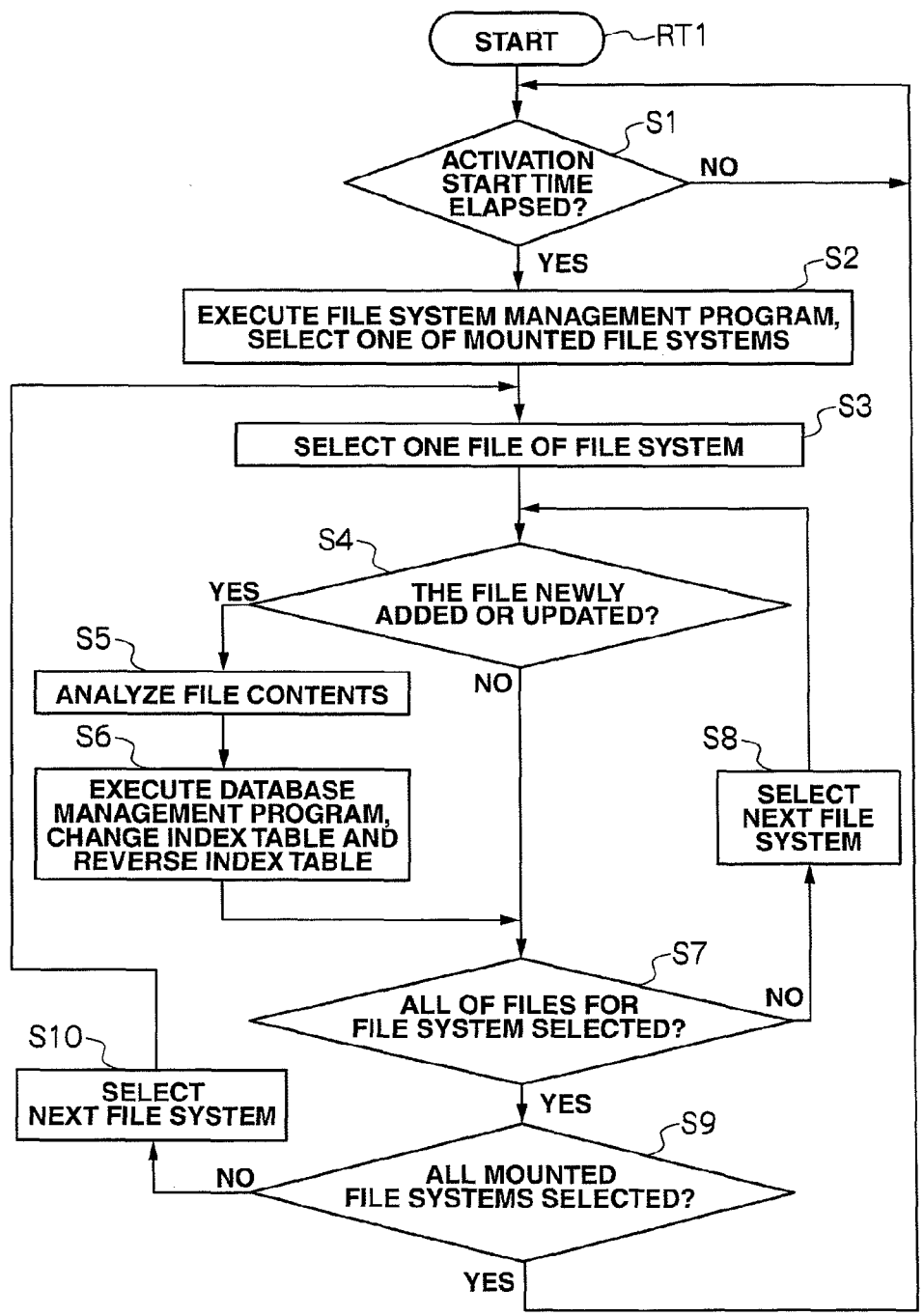
FIG. 9 is a flowchart showing an index generation procedure.

Next, a description is given of index generation occurring at the host apparatus 3. FIG. 9 is a flowchart showing a specific processing procedure of the CPU 15 of the host apparatus 3 relating to the index generation occurring at this host apparatus 3.

When the host apparatus 3 is started up, the CPU 15 of the host apparatus 3 waits in a standby mode for an activation start time of the index generation to elapse in accordance with the index generation procedure RT1 shown in FIG. 9 by executing the index generation program 43 making each type of index table. The activation start time is set to a fixed time interval that is comparatively short that is, for example a predetermined certain time of one day (once every 24 hours), etc.

When the activation start time for the index generation elapses (S1: YES), the CPU 15 of the host apparatus 3 checks the file systems mounted at the host apparatus 3 by executing the file system management program 36, and selects one file system of the file systems (S2). The CPU 15 of the host apparatus 3 then selects one file of the selected file system (S3). The CPU 15 of the host apparatus 3 then checks whether the selected file is a file that is newly added or whether or not the file is an updated file (S4).

In the event that the selected file is not a newly added file and is not an updated file (S4: NO), the CPU 15 of the host apparatus 3 proceeds to step S7. On the other hand, in the event that the selected file is a newly added file or an updated file (S4: NO), the CPU 15 of the host apparatus 3 reads out the file and analyzes the content of the file (S5).

The CPU 15 of the host apparatus 3 then produces the location information 128, attributes 126 and keyword list 127 based on the file analysis results by executing the database management program 46, and updates the index table 21 and/or the reverse index table 22 of the index database 20 using the produced location information 128, attributes 126, and keyword list 127 (S6).

The CPU 15 of the host apparatus 3 then checks whether or not all of the files of the selected file system have been selected (S7). In the event that all of the files for the selected file system have not been selected (S7: NO), the CPU 15 of the host apparatus 3 selects the next file of the selected file system (S8). After this, step S4 for checking whether or not the selected file is a newly added file or an updated file is returned to, and the same processing is then repeated (S4 to S8).

On the other hand, in the event that all of the files for the selected file system are selected (S7: YES), the CPU 15 of the host apparatus 3 checks whether or not all of the file systems mounted at the host apparatus 3 have been selected (S9). In the event that all of the file systems mounted at the host apparatus have not been selected (S9: NO), the CPU 15 of the host apparatus 3 selects the next file system (S10). After this, step S3 for selecting one file of the selected file systems is returned to and the same processing is repeated (S3 to S10).

On the other hand, in the event that all of the file systems mounted at the host apparatus 3 have been selected (S9: YES), the CPU 15 of the host apparatus 3 returns to a standby mode awaiting the elapsing of the activation start time for the index generation (S1), and after this, the same processing is repeated (S1 to S10).

Figure 10:
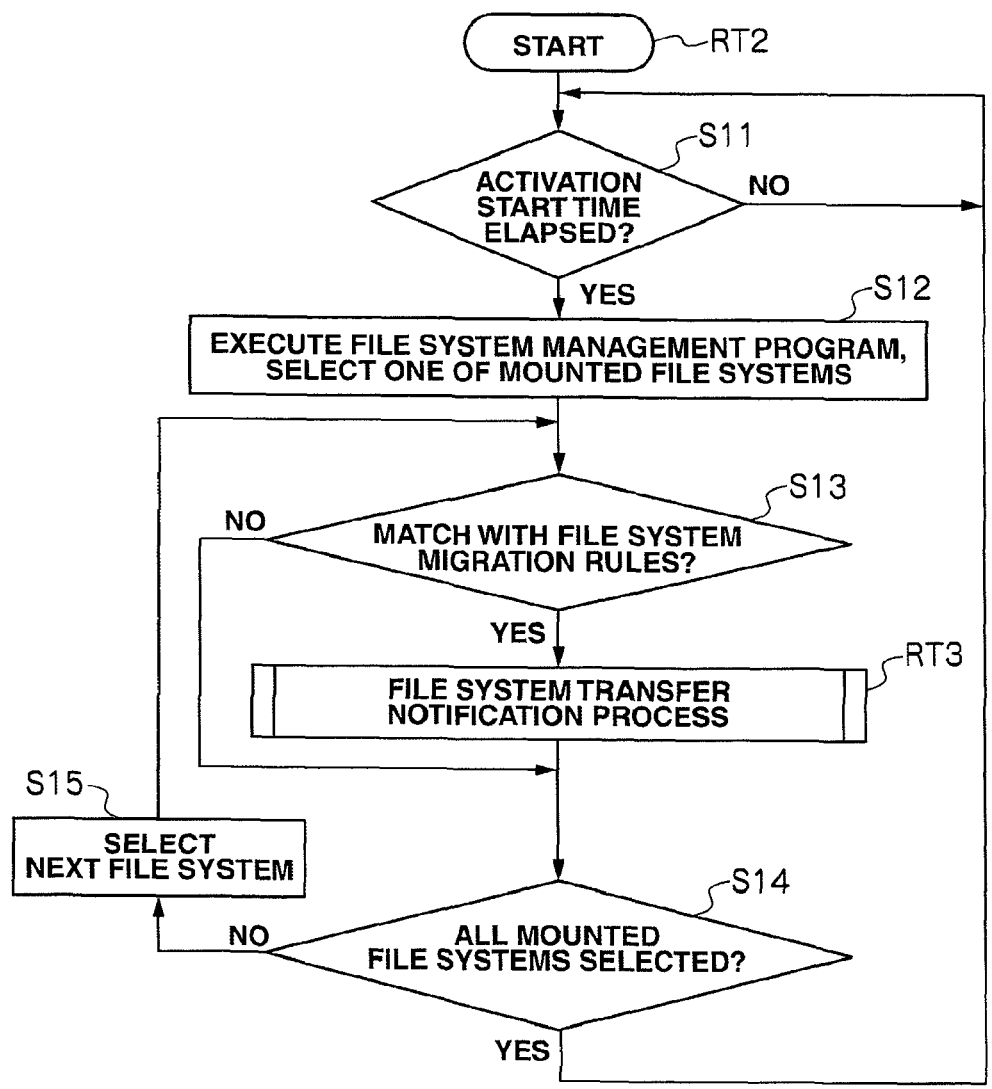
FIG. 10 is a flowchart showing a file system transfer start determination processing procedure.

Next a description is given of file system transfer start determination processing occurring at the file system transfer apparatus 4. FIG. 10 is a flowchart showing a detailed processing procedure of the CPU 55 of the file system transfer apparatus 4 relating to the file system transfer start determination processing occurring at this file system transfer apparatus 4.

When the file system transfer apparatus 4 starts up, the CPU 55 of the file system transfer apparatus 4 waits in standby mode for the activation start time of the file system transfer start determination process to elapse in accordance with file system transfer start determination processing procedure RT2 shown in FIG. 10 by executing the file system transfer start determination processing program 81 for determining whether or not transfer of the file system has started (S11). The activation start time is set to a fixed time interval that is comparatively long that is, for example, a predetermined certain time of a certain day of one month.

When the activation start time for the index generation elapses (S11: YES), the CPU 55 of the file system transfer apparatus 4 checks the file systems mounted at a predetermined host apparatus 3 by executing the file system management program 74, and selects one file system of the file systems (S12). The CPU 55 of the file system transfer apparatus 4 then checks whether or not the selected file system matches with the migration rules 61.

In the event that the selected file system does not match with the migration rules 61 (S13: NO), the CPU 55 of the file system transfer apparatus 4 proceeds to step S14 On the other hand, in the event that the selected file system matches with the migration rules 61 (S13: YES), the CPU 55 of the file system transfer apparatus 4 executes file system transfer notification processing (RT3) by executing the file system transfer notification program 83.

Figure 11:
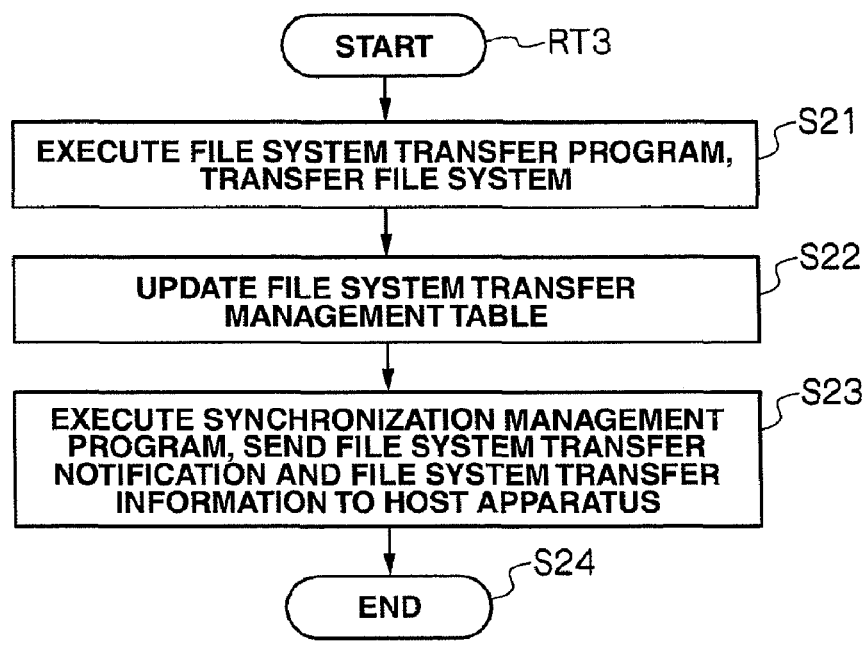
FIG. 11 is a flowchart showing a file system transfer processing procedure.

Here, a description is given of file system transfer processing occurring at the file system transfer apparatus 4. FIG. 11 is a flowchart showing a detailed processing procedure of the CPU 55 of the file system transfer apparatus 4 relating to the file system transfer processing occurring at this file system transfer apparatus 4.

When the selected file system matches with the migration rules 61, the CPU 55 of the file system transfer apparatus 4 transfers the selected file system from the logical volume 112A of the first storage apparatus 6 to the logical volume 112B of the second storage apparatus 7 in accordance with the file system transfer processing procedure RT3 shown in FIG. 11 by executing the file system transfer processing procedure 84 for transferring the file systems (S21).

Specifically, the CPU 55 of the file system transfer apparatus 4 sends the file system transfer request for the selected file system to the first storage apparatus 6 and the second storage apparatus 7. When a file system transfer request transmitted from the file system transfer apparatus 4 is received, the CPU 102A of the first storage apparatus 6 sends a file system stored in the logical volume 112A corresponding to the file system transfer request to the second storage apparatus 7. The CPU 102B of the second storage apparatus 7 stores the file system sent from the first storage apparatus 6 in the logical volume 112B. When transfer of the file system is complete, the second storage apparatus 7 sends the file system transfer completion notification to the file system transfer apparatus 4 and the first storage system 6. When a file system transfer completion notification is received from the second storage apparatus 7, the first storage apparatus 6 deletes the transmitted file system from the logical volume 112A.

When file system transfer completion notification is received from the second storage apparatus 7, the CPU 55 of the file system transfer apparatus 4 updates the file system transfer management table 62 (S22).

Specifically, at the mapping record corresponding to the file system identifier 151 of the file transfer management table 62 of the transferred file system, for example, the CPU 55 of the file system transfer apparatus 4 changes the file system state 152 from "primary storage", "write enabled", and "online" to "secondary storage", "write inhibit", and "online", changes the original storage apparatus identifier 154 and the original logical volume identifier 155 to the identifiers for the first storage apparatus 6 and the logical volume 112A stored by the transferred file system, and changes the current storage apparatus identifier 157 and the current logical volume identifier 158 to the identifiers for the second storage apparatus 7 and the logical volume 112B storing the transferred file system.

The CPU 55 of the file system transfer apparatus 4 then makes a file system transfer notification by executing the synchronization management program 82 that is a program controlling communication and synchronization with other apparatus such as the host apparatus 3, and sends the file system transfer notification and the file system transfer information 159 for the updated file transfer management table 62 to the host apparatus 3 corresponding to the current host apparatus identifier 156 of the mapping record (S23).

The CPU 55 of the file system transfer apparatus 4 then ends the file system transfer processing procedure RT3 (S24) after this, and proceeds to step S14 of the file system transfer start determination processing procedure RT2 shown in FIG. 10.

The CPU 55 of the file system transfer apparatus 4 then checks whether or not all of the file systems mounted on the host apparatus 3 have been selected (S14). In the event that all of the file systems mounted at the host apparatus 3 are not selected (S14: NO), the CPU 55 of the file system transfer apparatus 4 selects the next file system (S10). After this, step S13 for checking whether or not the selected file system matches with the migration rules 61 is returned to, and the same processing is then repeated (S13 to S15, RT3).

On the other hand, in the event that all of the file systems mounted at the host apparatus 3 have been selected (S14: YES), the CPU 15 of the host apparatus 3 returns to a standby mode awaiting the elapsing of the activation start time for the file system start determination processing (S11), and after this, the same processing is repeated (S11 to S15).

Figure 12:
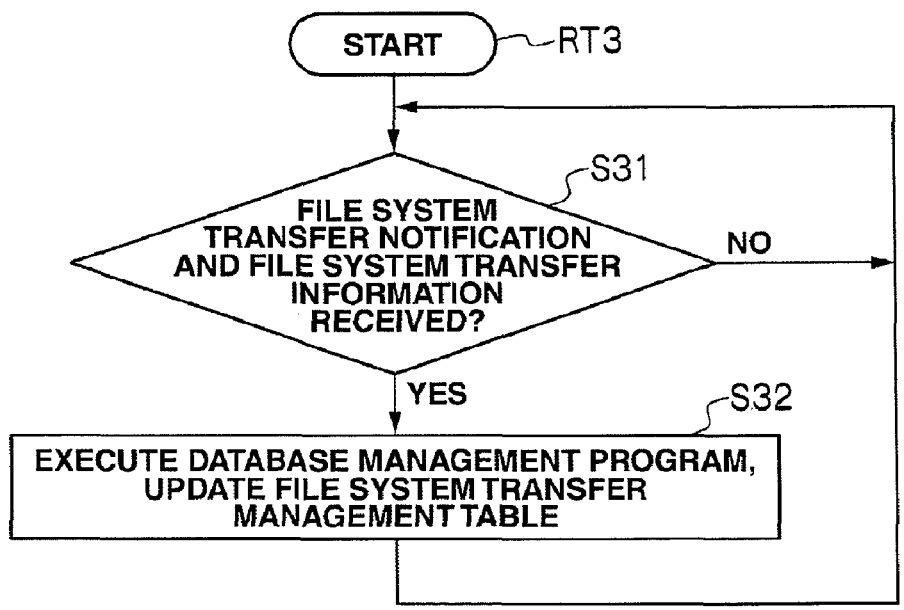
FIG. 12 is a flowchart showing an index update management processing procedure.

Next, a description is given of index update management processing occurring at the host apparatus 3. FIG. 12 is a flowchart showing a specific processing procedure of the CPU 15 of the host apparatus 3 relating to the index update management processing occurring at this host apparatus 3.

When the host apparatus 3 starts up, the CPU 15 of the host apparatus 3 waits in a standby mode to receive file system transfer notification and file system transfer information 159 of the system transfer management table 62 from the file system transfer apparatus 4 in accordance with the index update management processing procedure RT4 shown in FIG. 12 by executing the index update management processing program 44 for managing and updating the various index tables (S31).

When the synchronization management program 82 is executed at the file system transfer apparatus 4, when the synchronization management program 45 is then executed and file system transfer notification and file system transfer information 159 for the system transfer management table 62 is then received from the file system transfer apparatus 4 (S31: YES), the CPU 15 of the host apparatus 3 updates the file system transfer management table 23 of the index database 20 in the same way as updating the file system transfer management table 62 by executing the database management program 46 managing the index database 20 using the file system transfer information 159 of the file system transfer management table 62 (S32).

In this event, it is possible to perform update processing for the index database 20 at a substantially higher speed at the CPU 15 of the host apparatus 3 without updating the index records of the index table 21 constituted by an enormous number for managing each file by putting the index table to one side, managing the transfer of file systems at mapping records of the file system transfer management table 23 of a small total number of files, and managing logical volumes where these files are stored.

The CPU 15 of the host apparatus 3 then returns to a standby mode awaiting the receipt of file system transfer notification and file system transfer information 159 for the system transfer management table 62 from the file system transfer apparatus 4 (S31), and the same process is then repeated after this (S31 and S32).

Figure 13:
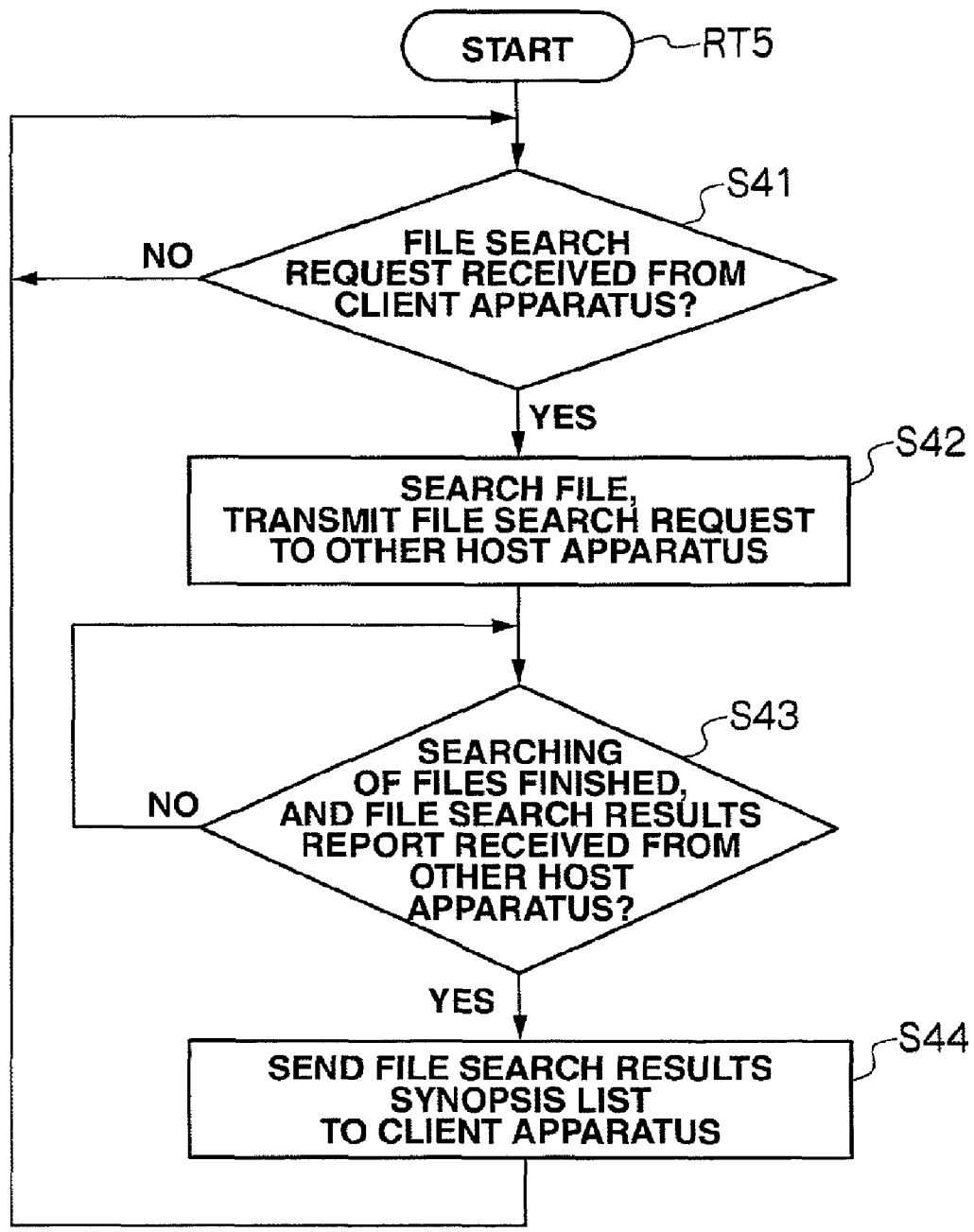
FIG. 13 is a flowchart showing a file system search handling procedure.

Next, a description is given of file search processing occurring at the host apparatus 3. FIG. 13 is a flowchart showing a specific processing procedure of the CPU 15 of the host apparatus 3 relating to the index update management processing occurring at this host apparatus 3.

When the host apparatus 3 is started up, the CPU 15 of the host apparatus 3 goes into standby mode awaiting the receipt of a file transfer request from the client apparatus 2 in accordance with the file search processing procedure RT5 shown in FIG. 13 by executing the file search processing program 41 for searching files (S41). Conditions for searching for files such as, for example, "files containing both keyword "budget" and keyword "IT" and searching of all of the files made during the past three years" etc. are described in the file search request.

Upon receiving the file search request from the client apparatus 2 (S41: YES), the CPU 15 of the host apparatus 3 searches the index table 21, reverse index table 22 and file system transfer management table 23 of the index database 20 by executing the database management program 46, and sends the file search request to another host apparatus 3 by executing the synchronization management program 45 (S42).

Specifically, in the event that the files are searched using the keywords, the CPU 15 of the host apparatus 3 obtains the index record number 132 of the keywords 131 by searching for keywords 131 of the reverse index table 22. Next, because the index record number 132 corresponds to the index record number 121, the CPU 15 of the host apparatus 3 obtains the file system identifier 123 of the index record number 121 from this index record number 121. The CPU 15 of the host apparatus 3 the obtains the current storage apparatus identifier 147 and the logical volume identifier 148 from this file system identifier 141 because the file system identifier 123 corresponds to the file system identifier 141.

Further, in the case of searching files using these attributes, the CPU 15 of the host apparatus 3 is capable of obtaining the file name 125 and file system identifier 123 of the attributes 126 by searching the attributes 126 of the index table 21. As in the case described above, the CPU 15 of the host apparatus 3 then obtains the current storage apparatus identifier 147 and the logical volume identifier 148 from this file system identifier 141 because the file system identifier 123 corresponds to the file system identifier 141.

The CPU 15 of the host apparatus 3 is therefore able to recognize which logical volume of which storage apparatus the file system corresponding to the file search request of the client apparatus 2 is currently stored in by searching the index table 21, reverse index table 22, and file system transfer management table 23 of the index database 20 as described above.

When the synchronization management program 82 is executed at the host apparatus 3 receiving a file search request from the client apparatus 2, the synchronization management program 45 is executed, and the file search request is received from the host apparatus 3, as in the case described above, by executing the database management program 46, the CPU 15 of the other host apparatus 3 searches the index table 21, the reverse index table 22 and the file system transfer management table 23 of the index database 20, and sends the file name 125, current storage apparatus identifier 147 and current logical volume identifier 148 subject to the file search request from the client apparatus 2 to the host apparatus 3 that received the file search request as a file search results report.

Continuing on, the CPU 15 of the host apparatus 3 ends searching of the index table 21, reverse index table 22 and file system transfer management table 23 of the index database 20, and awaits the receipt of the file search results report from all of the other host apparatus 3 in standby mode (S43).

When searching of the index table 21, reverse index table 22, and file system transfer management table 23 of the index database 20 is complete and file search results report is received from all of the other host apparatus 3 (S43: YES), the CPU 15 of the host apparatus 3 makes a file search results synopsis list corresponding to the file search request from the client apparatus 2 based on the file search results at the host apparatus 3 and the file search results report from all of the other host apparatus 3, and sends the file search results synopsis list to the client apparatus 2 (S44).

The CPU 15 of the host apparatus 3 then returns to standby mode where receipt of a file search request from the client apparatus 2 is again awaited (S41), and then repeats the same processing (S41 to S44).

Figure 14:
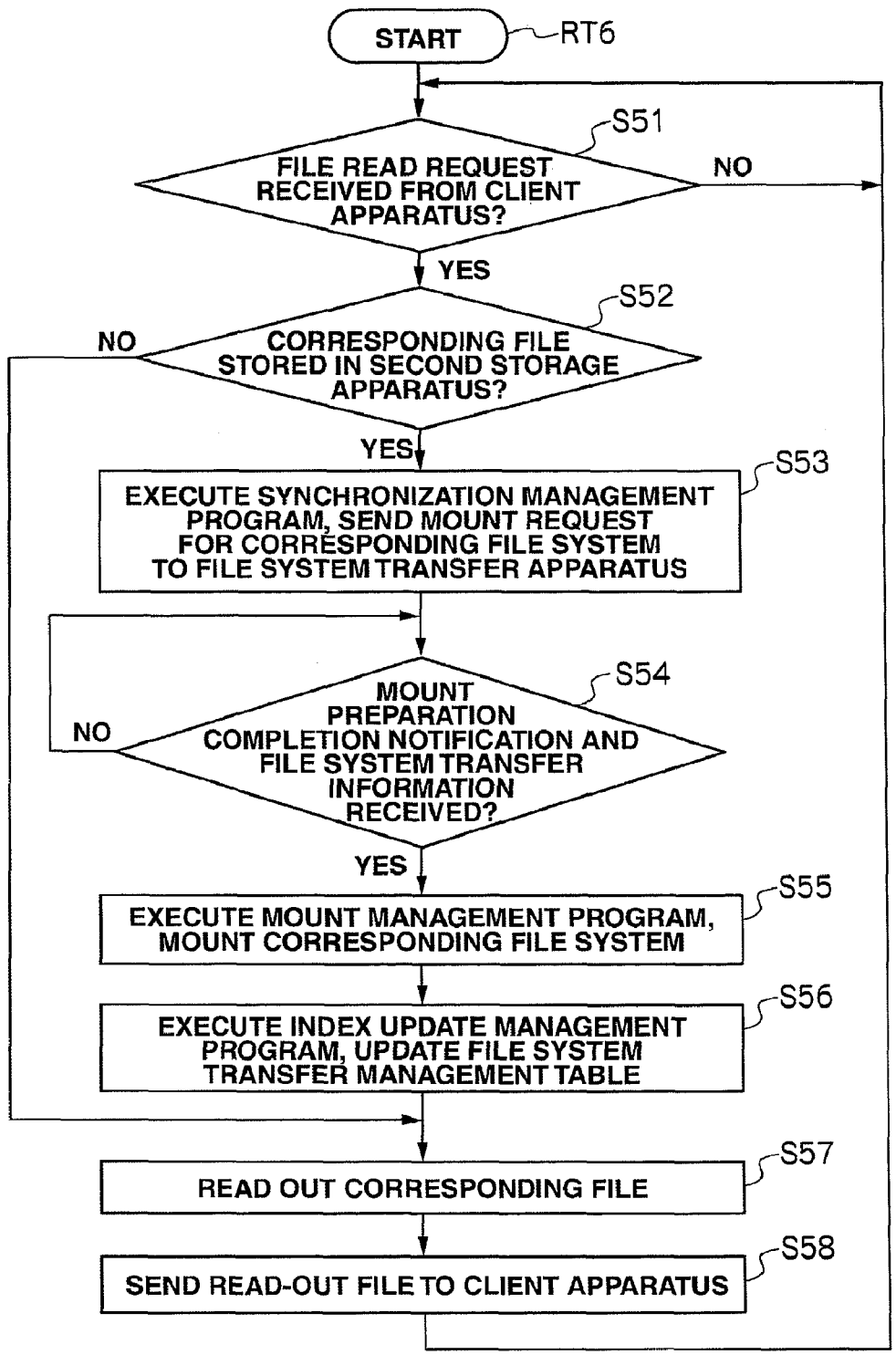
FIG. 14 is a flowchart showing a file system read processing procedure.

Next, a description is given of file read processing occurring at the host apparatus 3. FIG. 14 is a flowchart showing a specific processing procedure of the CPU 15 of the host apparatus 3 relating to the file read processing occurring at this host apparatus 3.

When the host apparatus 3 is started up, the CPU 15 of the host apparatus 3 goes into standby mode awaiting the receipt of a file read request from the client apparatus 2 in accordance with the file read processing procedure RT6 shown in FIG. 14 by executing the file reading processing program 42 for reading files (S51). The client apparatus 2 then refers to the file search results synopsis list sent from the host apparatus 3, and in the event that a file the user of the client apparatus 2 wishes to read exists, a file read request for the file is sent to the host apparatus 3.

When a file read request is received from the client apparatus 2 (S51: YES), the CPU 15 of the host apparatus 3 refers to the file search results at the host apparatus 3 and the current storage apparatus identifier 147 and the current logical volume identifier 148 in the file search results report from the all of the other host apparatus 3, and checks whether or not the file corresponding to the file read request is stored in the second storage apparatus 7 (S52).

In the event that a file corresponding to the file read request is not stored in the second storage apparatus 7 (S52: NO), the CPU 15 of the host apparatus 3 proceeds to step S57. On the other hand, in the event that the file corresponding to the file read request is stored in the second storage apparatus 7 (S52: YES), the CPU 15 of the host apparatus 3 sends a mount request for the file system of the file corresponding to the file read request to the file system transfer apparatus 4 by executing the synchronization management program 45 (S53).

Continuing on, the CPU 15 of the host apparatus 3 awaits the receipt of a mount preparation completion notification from the file system transfer apparatus 4 in standby mode (S54). When the synchronization management program 82 is executed at the file system transfer apparatus 4, the synchronization management program 45 is executed, and mount preparation completion notification and file system transfer information 159 of the system transfer management table 62 is received (S54: YES), by executing the file system mounting program 35, the CPU 15 of the host apparatus 3 refers to the current storage apparatus identifier 157 and the current logical volume identifier 158 at the file system transfer information 159 of the system transfer management table 62, and mounts the file system corresponding to the file read request at the host apparatus 3 (S55).

The CPU 15 of the host apparatus 3 updates the file system transfer management table 23 (S56) in the same way as the updating occurring at the file system transfer management table 62 described in the following by executing the database management program 46 and using the file system transfer information 159 for the file system transfer management table 62.

The CPU 15 of the host apparatus 3 then reads out a file corresponding to the file read request from the file system (S57). The CPU 15 of the host apparatus 3 sends the file to the client apparatus 2 that transmitted the file read request (S58). The CPU 15 of the host apparatus 3 then returns to standby mode where receipt of a file read request from the client apparatus 2 is again awaited (S51), and then repeats the same processing (S51 to S58).

Figure 15:
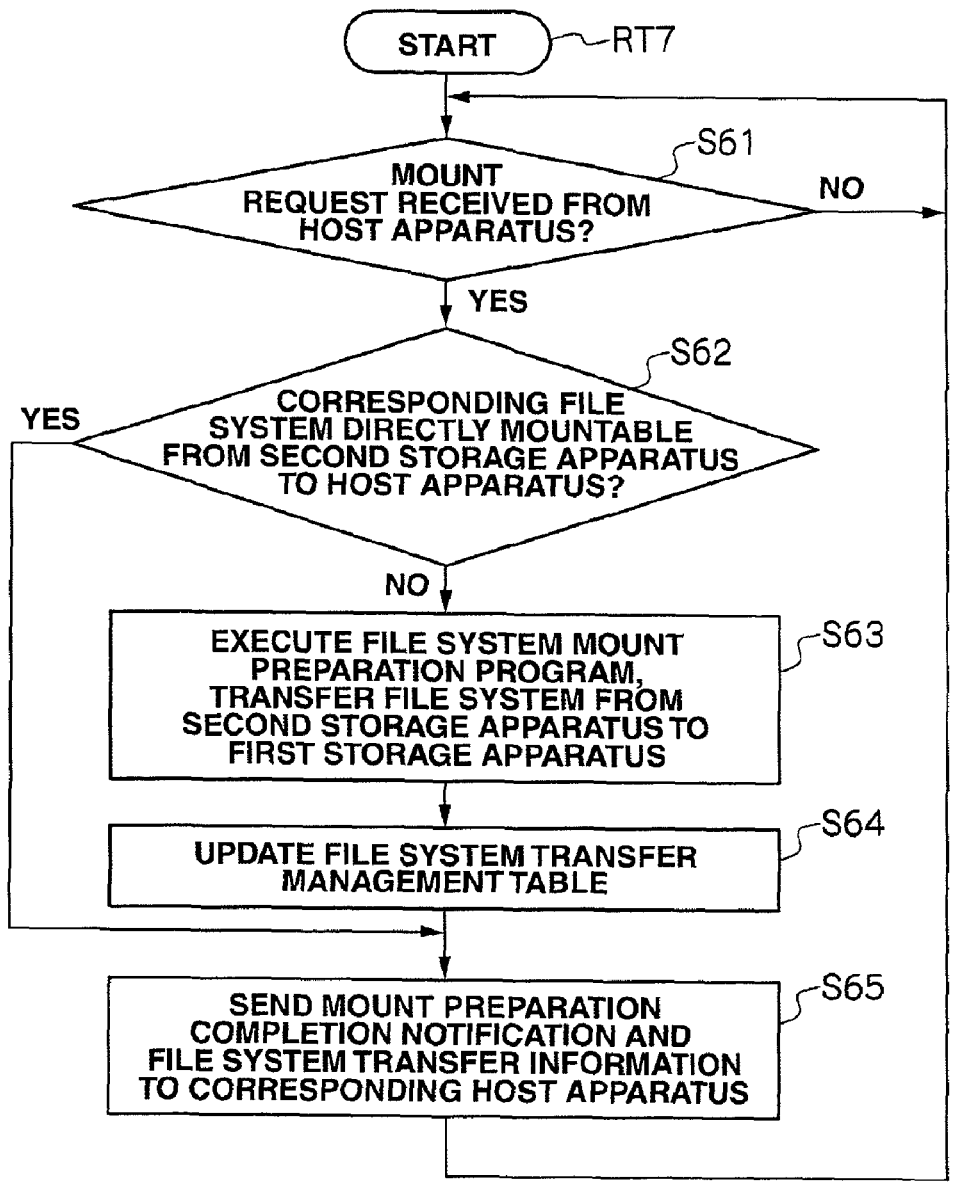
FIG. 15 is a flowchart showing a file system mount preparation processing procedure.

Next a description is given of file system mount preparation processing occurring at the file system transfer apparatus 4. FIG. 15 is a flowchart showing a detailed processing procedure of the CPU 55 of the file system transfer apparatus 4 relating to the file system mount preparation processing occurring at this file system transfer apparatus 4.

The CPU 55 of the file system transfer apparatus 4 awaits the receipt of a mount request from the host apparatus 3 in standby mode (S61). When the CPU 55 of the file system transfer apparatus 4 receives a mount request from the host apparatus 3 (S61: YES), the file system of the file corresponding to the file read request checks whether or not direct mounting from the second storage apparatus 7 to the host apparatus 3 is possible (S62).

Specifically, the CPU 55 of the file system transfer apparatus 4 has a table (not shown) within memory 56 describing in advance whether direct mounting of host apparatus 3 such as, for example, storage apparatus of a VDL (Virtual Disk Library) or SATA disc drive etc. can be directly mounted, or whether direct mounting is possible at host apparatus 3 such as a tape library etc. for, for example, all of the second storage apparatus 7 that are connected, and checks whether or not direct mounting is possible in accordance with the table.

In the event that it is possible for the file system corresponding to the file read request to be directly mounted at the host apparatus 3 from the second storage apparatus 7 (S62: YES), the CPU 55 of the file system transfer apparatus 4 proceeds to step 64. On the other hand, in the event that it is not possible to directly mount the file system for the file corresponding to the file read request from the second storage apparatus 7 to the host apparatus 3 (S62: NO), the CPU 55 of the file system transfer apparatus 4 transfers the file system for the file corresponding to the file read request from the logical volume 112B of the second storage apparatus 7 to the logical volume 112A of the first storage apparatus 6 (S63).

Specifically, the CPU 55 of the file system transfer apparatus 4 sends the file system transfer request of the file system of the file corresponding to the file read request to the first storage apparatus 6 and the second storage apparatus 7. When a file system transfer request transmitted from the file system transfer apparatus 4 is received, the CPU 102B of the second storage apparatus 6 sends a file system stored in the logical volume 112B corresponding to the file system transfer request to the first storage apparatus 6. The CPU 102A of the first storage apparatus 6 then stores the file system sent from the second storage apparatus 7 in the logical volume 112A. When transfer of the file system is complete, the first storage apparatus 6 sends the file system transfer completion report to the file system transfer apparatus 4 and the first storage system 6.

When file system transfer completion notification is received from the first storage apparatus 6, the CPU 55 of the file system transfer apparatus 4 updates the file system transfer management table 62 (S64).

Specifically, in the event that, for example, it is possible to directly mount the file system for the file corresponding to the file read request from the second storage apparatus 7 to the host apparatus 3, the CPU 55 of the file system transfer apparatus 4 changes the file system state 152 from "secondary storage", "write inhibit" and "offline" to "secondary storage", "write permit", and "online" at the mapping record corresponding to the file system identifier 151 of the file transfer management table 62 of the file system.

Further, in the event that, for example, the file system of the file corresponding to the file read request cannot be directly mounted from the second storage apparatus 7 to the host apparatus 3, the CPU 55 of the file system transfer apparatus 4 changes the file system state 152 from "secondary storage", "write inhibit", and "offline" to "primary storage", "write inhibit", and "online" at the mapping record corresponding to the file system identifier 151 of the file transfer management table 62 of the file system, changes the original storage apparatus identifier 154 and the original logical volume identifier 155 to the identifiers of the second storage apparatus 7 and the logical volume 112B that stored the transferred file, and changes the current storage apparatus identifier 157 and current logical volume identifier 158 to the identifiers of the first storage apparatus 6 and the logical volume 112A that stored the transferred file system.

The CPU 55 of the file system transfer apparatus 4 makes file system mount preparation completion notification by executing the synchronization management program 82, and sends the file system mount preparation completion notification and the file system transfer information 159 for the updated file transfer management table 62 to the host apparatus 3 corresponding to the current host apparatus identifier 156 of the mapping code (S65).

After this, the CPU 55 of the file system transfer apparatus 4 returns to a standby mode so as to await the receipt of a mount request from the host apparatus 3 (S61), and the same processing is then repeated thereafter (S61 to S65).

Rather than transferring the file system corresponding to the file read request from the logical volume 112B of the second storage apparatus 7 to the logical volume 112A of the first storage apparatus 6 (S63), the CPU 55 of the file system transfer apparatus 4 can also operate so as to duplicate the file system to the logical volume 112A of the first storage apparatus 6.

In this case, the CPU 55 of the file system transfer apparatus 4, for example, stores a table (not shown) housing a file system identifier 151 for the duplicated file system in memory 56, and stores a file system identifier 153 for the duplicated file system in the table when the file system is duplicated at the logical volume 112A of the first storage apparatus 6.

After this, in the event that the CPU 55 of the file system transfer apparatus 4 transfers the files again from the logical volume 112A to the logical volume 112B of the second storage apparatus 7 in accordance with the file system transfer processing procedure RT3 shown in FIG. 11 described above (S21), the file system is already stored in the logical volume 112B of the second storage apparatus 7, and the same results as for transferring the system file from the logical volume 112A of the first storage apparatus 6 to the logical volume 112B of the second storage apparatus 7 can be obtained by deleting the file system from the logical volume 112A of the first storage apparatus 6.

Namely, the file system selected as described above is transferred from the logical volume 112A of the first storage apparatus 6 to the logical volume 112B of the second storage apparatus 7 (S21), the table storing the file system identifier 151 of the duplicated file system is searched, and in the event that the file system identifier 151 for the file system selected in the manner described above is stored on the table, the CPU 55 of the file system transfer apparatus 4 deletes the file system from the logical volume 112A of the first storage apparatus 6, transfer from the logical volume 112A of the first storage apparatus 6 to the logical volume 112B of the second storage apparatus 7 can be completed, and the speed of file system transfer processing can be increased dramatically.

At this time, at the mapping record corresponding to the file system identifier 151 of the file transfer management table 62 of the transferred file system, for example, the CPU 55 of the file system transfer apparatus 4 changes the file system state 152 from "primary storage", "write enabled", and "online" to "secondary storage", "write inhibited", and "online", and switches over the original storage apparatus identifier 154 and the original logical volume identifier 155 with the current storage apparatus identifier 157 and the current logical volume identifier 158.

In this way, at the data management system 1, at the file system transfer apparatus 4, the file system is transferred from the logical volume 112A of the first storage apparatus 6 to the logical volume 112B of the second storage apparatus 7 based on the file system transfer management table 61, the file system transfer update information 159 of the file system transfer management table 62 of the file system transfer management apparatus 4 updated in accordance with the transfer of the file system is sent to the host apparatus 3, and the file system transfer information 159 of the file system transfer management table 23 of the index database 20 of the host apparatus 3 is updated (A3).

Therefore, at the data management system 1, when a file search request is received from the client apparatus 2, the state where the file system management table 23 is not updated is effectively prevented before it happens, it is possible to search for the file corresponding to the file search request, and as a result, it is possible to read the file requested by the client apparatus 2. It is therefore possible to provide a data management system with highly convenient file management and low operating costs, having both high availability and reliability.

Further, with the data management system 1, at the file system transfer apparatus 4, it is determined whether or not the file system for the file corresponding to the file read request is capable of being mounted directly from the second storage apparatus 7 to the host apparatus 3. In the event that direct mounting is not possible, the file system for the file corresponding to the file read request is transferred from the logical volume 112B of the second storage apparatus 7 to the logical volume 112A of the first storage apparatus 6 so as to make mounting possible. This means that it is possible to prevent a situation where a file of a file system cannot be read even in the event of transfer from the first storage apparatus 6 to the second storage apparatus 7 and it is possible to read the file requested by the client apparatus 2.

Further, with the data management system 1, at the file system transfer apparatus 4, by duplicating the file system of the file corresponding to the file read request from the logical volume 112B of the second storage apparatus 7 to the logical volume 112A of the first storage apparatus 6, when the file system is then again transferred from the logical volume 112A of the first storage apparatus 6 to the logical volume 112B of the second storage apparatus 7, it is possible to obtain the same results as for transferring from the logical volume 112A of the first storage apparatus 6 to the logical volume 112B of the second storage apparatus 7 by deleting the file system from the logical volume 112A of the first storage apparatus 6.

Figure 16:
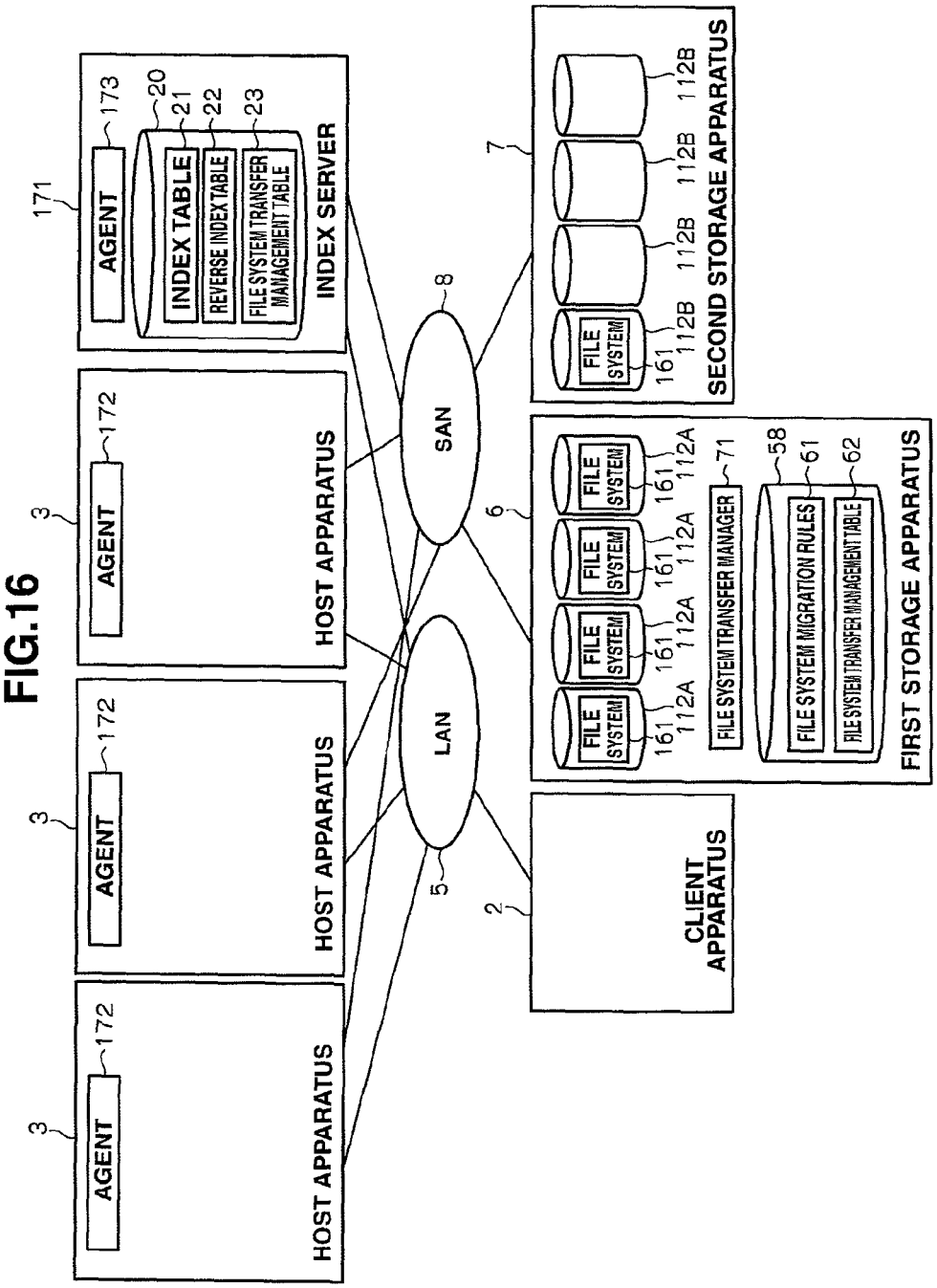
FIG. 16 is a block view showing an outline configuration for a data management system of a further embodiment.

In this embodiment, a description is given of the case where each host apparatus 3 implements an index producing function and an index updating management function, but the present invention is by no means limited in this respect, and, for example, as shown in FIG. 16, an index server 171 may be provided, with the agent 32 then being divided into an agent 172 having a file search function and a file read function and an agent 173 having an index producing function and an index update management function. An index producing function and index update management function implemented with each host apparatus 3 distributed may then be implemented focused on the index server 171.

Further, in this embodiment, a description is given of the case where the file system transfer apparatus 4 is provided, and the file system transfer apparatus 4 implements each of the functions relating to the file system transfer described above, but the present invention is by no means limited in this respect, and, for example, as shown in FIG. 16, it is also possible for the first storage apparatus 6 to have the function relating to transfer of the file systems in the possession of the file system transfer apparatus 4, and to implement each of the functions relating to file system transfer the file system transfer apparatus 4 is in possession of at the first storage apparatus 6.

The present invention is therefore broadly applicable to data management systems that search files based on requests from client apparatus and read out the files from client apparatus.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A data management system comprising:
   a host apparatus receiving requests from a client apparatus;
   a first storage apparatus having a first volume for storing a file system composed of a set of files;
   a second storage apparatus having a second volume; and
   a file system transfer apparatus for transferring the file system from the first volume of the first storage apparatus to the second volume of the second storage apparatus, when the set of files in the file system has not been accessed for a predetermined period of time,
   wherein the host apparatus has location information and file system transfer information, the location information is managed in file units and includes an identifier of each file and an identifier of the file system to which the file belongs, and the file system transfer information is managed in file system units and indicates the transfer before and after transfer for the file system and storage location of the file system,
   wherein when the file system transfer apparatus migrates the file system, the file system transfer apparatus sends a notice of the transfer to the host apparatus, the host apparatus updates the file system transfer information in response to receiving the notice of the transfer, the host apparatus accesses the file in the file system using the location information and the updated file system transfer information.

2. The data management system according to claim 1, further comprising:
   a mount determination apparatus for determining whether or not a file system for a file corresponding to a file read request from the client apparatus is capable of being directly mounted from the second storage apparatus to the host apparatus,
   wherein a file system transfer apparatus transfers the file system from the second volume of the second storage apparatus to the first volume of the first storage apparatus that is capable of mounting the file system on the host apparatus in the event that the mount determination apparatus determines that the file system can not be directly mounted.

3. The data management system according to claim 2, wherein the host apparatus includes a mount management apparatus for managing mounting and un-mounting of the file system, the mount management apparatus directly mounting the file system for the file corresponding to the file read request from the client apparatus from the second storage apparatus in the event that the mount determination apparatus determines that direct mounting of the file system is possible.

4. The data management system according to claim 3, wherein the file system transfer apparatus duplicates the file system from the second volume of the second storage apparatus onto the first volume of the first storage apparatus that is capable of mounting the file system on the host apparatus in the event that the mount determination apparatus determines that the file system cannot be directly mounted.

5. The data management system according to claim 2, further comprising:
   a file system storage information manager for updating storage information of the file system in accordance with transfer of the file system by the file system transfer apparatus, and transmitting the updated file system storage information; and
   a search information manager for updating search information for searching for a file based on a file search request from the client apparatus using the file system storage information sent from the file system storage information manager.

6. The data management system according to claim 5, wherein the search information includes information indicating a host apparatus, a file system, attributes and a keyword list for each file; information indicating a file and attributes for each keyword; and information indicating a host apparatus, a storage apparatus and a volume as of the time before transfer, a host apparatus, a storage apparatus and a volume as of the time after transfer, and the storage state of the file system, for each file system.

7. The data management system according to claim 5, wherein the storage information further includes information indicating a host apparatus, a storage apparatus and a volume as of the time before transfer, a host apparatus, a storage apparatus and a volume as of the time after transfer, and the storage state of the file system, for each file system.

8. The data management system according to claim 5, wherein the file system storage information manager is provided in the file system transfer apparatus and a search information manager is provided in each of a plurality of the host apparatuses.

9. The data management system according to claim 8, wherein the search information manager is provided in an index server and the file system transfer apparatus and the file system storage information manager are provided in the first storage apparatus.

10. The data management system according to claim 1, wherein the file system transfer apparatus employs file system migration rules that include fixed rules for transferring a file system, related at least to one of (1) a period of reading or writing processing, (2) transfer of the file system and (3) frequency of read/write processing during a given period of time.

11. A data management method for a system including a host apparatus operative to receive requests from a client apparatus, a first storage apparatus having a first volume for storing a file system composed of a set of files, and a second storage apparatus having a second volume for storing the file system sent from the first storage apparatus, comprising:

transferring the file system matching with file system migration rules from the first volume of the first storage apparatus to the second volume of the second storage apparatus when the set of files in the file system has not been accessed for a predetermined period of time; and managing the system such that, when the host apparatus has location information and file system transfer information, the location information is managed in file units and includes an identifier of each file and an identifier of the file system to which the file belongs, and the file system transfer information is managed in file system units and indicates the transfer before and after transfer for the file system and storage location of the file system, and when the file system is migrated, a notice of transfer is sent to the host apparatus, the host apparatus updates the file system transfer information in response to receiving the notice of transfer, and the host apparatus accesses the file in the file system that was transferred using the location information and the updated file system transfer information.

12. The data management method according to claim 11, further comprising:

determining whether or not a file system for a file corresponding to a file read request from the client apparatus is capable of being directly mounted from the second storage apparatus to the host apparatus, and transferring the file system from the second volume of the second storage apparatus to the first volume of the first storage apparatus that is capable of mounting the file system on the host apparatus in the event that the determining step determines that the file system can not be directly mounted.

13. The data management method according to claim 12, further comprising managing mounting and un-mounting of the file system in the host system, the mounting and un-mounting managing step involving directly mounting the file system for the file corresponding to the file read request from the client apparatus from the second storage apparatus in the event that the determining step determines that direct mounting of the file system is possible.

14. The data management method according to claim 13, wherein the transferring step comprises duplicating the file system from the second volume of the second storage apparatus onto the first volume of the first storage apparatus that is capable of mounting the file system on the host apparatus in the event that the determining step determines that the file system can not be directly mounted.

15. The data management method according to claim 11, further comprising:

updating storage information of the file system by a file system storage information manager in accordance with transfer of the file system by the file system transfer apparatus, and transmitting the updated file system storage information; and updating by a search information manager search information for searching for a file based on a file search request from the client apparatus using the file system storage information sent from the file system storage information manager.

16. The data management method according to claim 15, wherein the search information includes information indicating a host apparatus, a file system, attributes and a keyword list for each file; information indicating a file and attributes for each keyword; and information indicating a host apparatus, a storage apparatus and a volume as of the time before transfer, a host apparatus, a storage apparatus and a volume as of the time after transfer, and the storage state of the file system, for each file system.

17. The data management method according to claim 15, wherein the storage information further includes information indicating a host apparatus, a storage apparatus and a volume as of the time before transfer, a host apparatus, a storage apparatus and a volume as of the time after transfer, and the storage state of the file system, for each file system.

18. The data management system according to claim 11, wherein the transferring step is executed according to file system migration rules that include fixed rules for transferring a file system that are related at least to one of (1) a period of reading or writing processing, (2) transfer of the file system and (3) frequency of read/write processing during a given period of time.

* * * * *